United States Patent Office 3,345,354
Patented Oct. 3, 1967

3,345,354
INTERMEDIATE IN THE SYNTHESIS OF
$\alpha^{1-24}$ ACTH
Heini Kappeler, Bettingen, and Robert Schwyzer, Riehen, Switzerland, assignors to Ciba Corporation, New York, N.Y., a corporation of Delaware
No Drawing. Filed Feb. 7, 1964, Ser. No. 343,227
Claims priority, application Switzerland, May 4, 1961, 5,242/61; Nov. 24, 1961, 13,753/61; Aug 1, 1962, 9,208/62; Jan. 21, 1963, 2,208/63, 2,209/63; Jan. 10, 1964, 251/64
1 Claim. (Cl. 260—112.5)

The present application is a continuation-in-part of our copending application Ser. No. 294,747, filed July 12, 1963 (now abandoned), which is itself a continuation-in-part of Ser. No. 191,443, filed May 1, 1962, and now U.S. Patent No. 3,228,926.

The present invention provides a process for the manufacture of the tetracosapeptides of the formula L-seryl-L-tyrosyl-L-seryl-L-methionyl-L-X-L-histidyl-L - phenylalanyl-L-arginyl-L-tryptophyl-glycyl-L-lysyl-L-prolyl-L - valyl-glycyl-L-lysyl-L-lysyl-L-arginyl-L-arginyl-L - prolyl - L-valyl-L-lysyl-L-valyl-L-tyrosyl-L-prolin in which X stands for a member selected from the group consisting of the radical of glutamine and of glutamic acid and their derivatives, acid addition salts, and heavy metal complexes. Heavy metal complexes are those of copper, cobalt and especially of zinc.

Derivatives are above all functional derivatives such as esters, for example lower alkyl esters, e.g. methyl, ethyl, propyl, isopropyl, isobutyl, tertiary butyl esters, amides and hydrazides, as well as N-substitution products such as N-acyl, for instance N-lower alkanoyl, more especially N-acetyl and N-tertiary butyloxycarbonyl derivatives and compounds containing other amino protecting groups, for instance trityl, carbobenzoxy and substituted carbobenzoxy, for instance para-halogeno-carbobenzoxy, para-methoxy-carbobenzoxy, para-phenylazobenzyloxycarbonyl and para-(para'-methoxyphenylazo)-benzyloxycarbonyl.

The new compounds display a considerably adrenocorticotropic activity and are intended to be used in human and veterinary medicine as chemically pure and uniform compounds in place of ACTH. Suitable for the preparation of synthetic corticotropin derivatives having a prolonged activity is in particular the aforementioned sparingly soluble zinc complex. The compounds may also be used as intermediates for the manufacture of medicaments containing a longer chain of amino acids, such as the adrenocorticotropic hormones themselves.

There are various possibilities available for synthesizing the tetracosa peptide from the individual amino acids or small peptide units. According to one process, for example, the decapeptide L-seryl-L-tyrosyl-L-seryl-L-methionyl-L-glutamyl-(or glutaminyl)-L-histidyl-L - phenylalanyl-L-aringyl-L-tryptophyl-glycine is condensed with the tetradecapeptide L-lysyl-L-prolyl-L - valyl - glycyl - L-lysyl-L-lysyl-L-arginyl-L-arginyl-L-prolyl-L-valyl-L - lysyl-L-valyl-L-tyrosyl-L-prolin as represented, for example, in Table 1 for the compound containing as the fifth amino acid L-glutamic acid. In the following tables BOC represents the tertiary butyloxycarbonyl group, tBu the tertiary butyl group. iBu the isobutyl group, Z the carbobenzoxy group, PZ the para - phenylazobenzyloxy - carbonyl group, and T the trityl group. The decapeptide used as starting material can be prepared by the process described in U.S. patent application Ser. No. 114,636, filed June 5, 1961 by Robert Schwyzer et al. and now U.S. Patent No. 3,256,526.

The tetradecapeptide is obtained, for example, by the reaction scheme shown in the Table 2.

TABLE 1

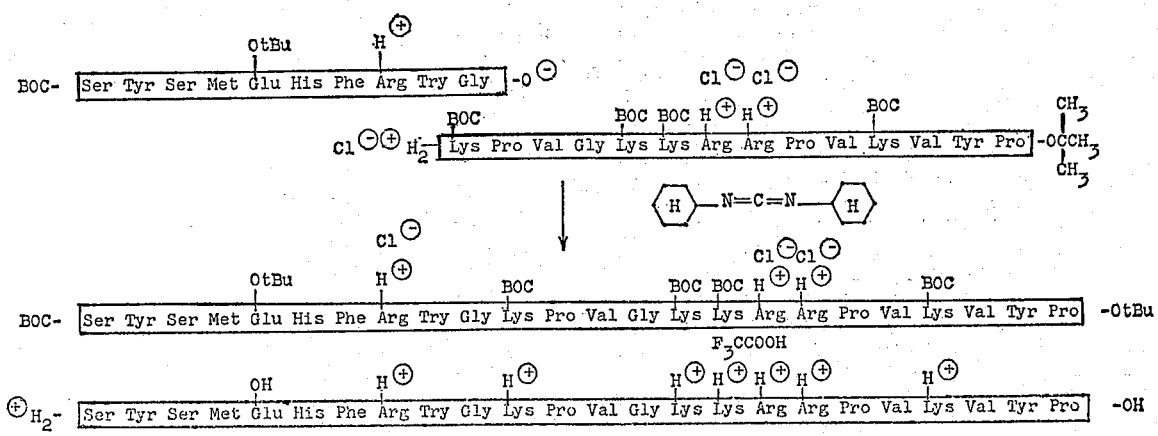

TABLE 2

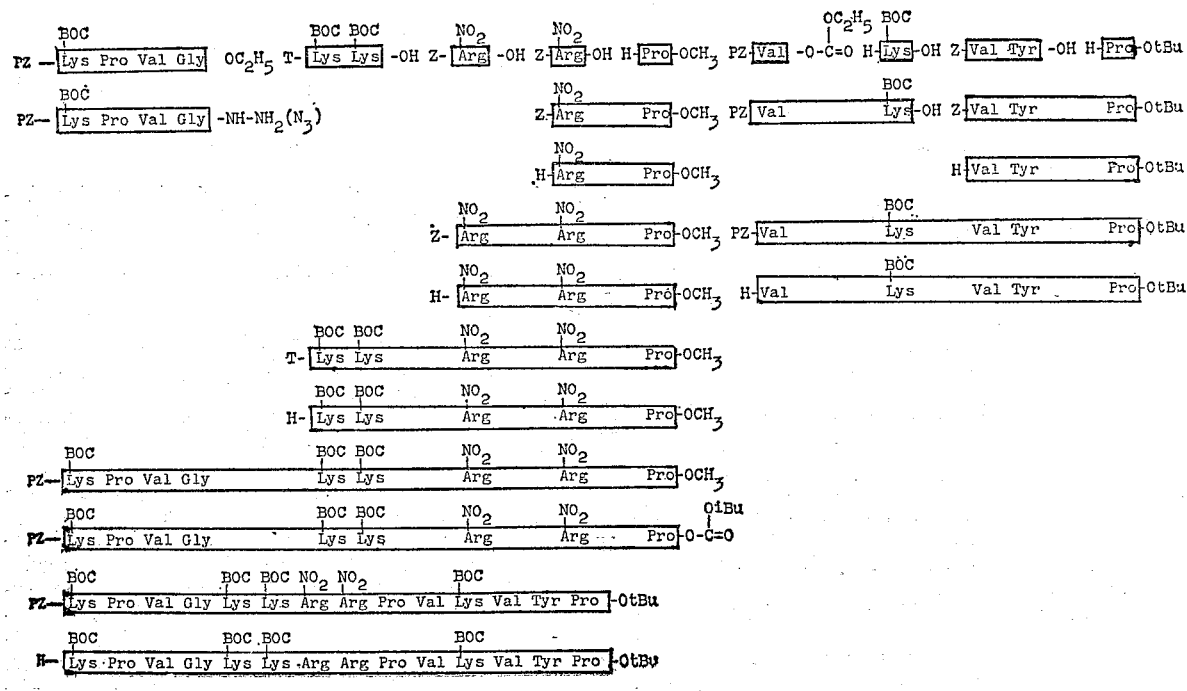

Another way of obtaining the tetradecapeptide derivative tertiary - butyloxycarbonyl-L-lysyl-L-prolyl-L-valyl-glycyl - tertiary - butyloxycarbonyl-L-lysyl-tertiary-butyloxycarbonyl - L - lysyl-L-arginyl-L-arginyl-L-prolyl-L-valyl - tertiary - butyloxycarbonyl - L - lysyl-L-valyl-L-tyrosyl - L - proline - tertiary-butyl ester in advatageous manner consists in condensing L-proline-tertiary butyl ester with carbobenzoxy - L - valyl-L-tyrosine azide; from the resulting tripeptide derivative the carbobenzoxy group is eliminated; the free tripeptide ester is condensed with carbobenzoxy - $N^\epsilon$ - tertiary butyloxycarbonyl-L-lysine; from the resulting tetrapeptide ester the carbobenzoxy group is eliminated; the free tetrapeptide ester is condensed with carbobenzoxy-L-valine; from the resulting pentapeptide ester the carbobenzoxy group is eliminated; the resulting L-valyl-tertiary-butyloxycarbonyl-L-lysyl-L-valyl-L-tyrosyl-L-proline-tertiary-butyl ester is condensed with carbobenboxy - L - arginyl - L - arginyl-L-proline to form the protected octapeptide ester; from which the carbobenzoxy group is eliminated and the resulting free octapeptide ester is condensed with carbobenzoxy-$N^\epsilon$-tertiary butyloxycarbonyl - L - lysyl-L-prolyl-L-valyl-glycyl - tertiary butyloxycarbonyl - L-lysyl-tertiary butyloxycarbonyl - L - lysine azide [obtained e.g. by condensing carbobenzoxy - $N^\epsilon$ - tertiary butyloxycarbonyl-L-lysyl - L - prolyl - L - valyl-glycine with $N^\epsilon$-tertiary butyloxycarbonyl - L - lysyl - tertiary butyloxycarbonyl-L - lysine methyl ester to form the carbobenzoxy-$N^\epsilon$-tertiary - butyloxycarbonyl - L - lysyl-L-prolyl-L-valyl-glycyl - tertiary - butyloxycarbonyl - L - lysyl - tertiary-butyloxycarbonyl - L - lysine - methyl ester and conversion of the ester into the hydrazide and azide] to form the tetradecapeptide ester from which finally the carbobenzoxy group is eliminated (cf. Table 3).

According to an advantageous modification of the process shown in Table 1, the imino group of the histidine radical is blocked by the trityl group; the $N^{im}$-trityl histidyl-radical is kept intact through all the condensation stages and eliminated only at the stage of the tetracosapeptide together with all further protective groups. Thus, when the protective group used is the tertiary butyloxycarbonyl group (on serine[1] and lysine[11,15,16] and [21]) and the tertiary butyl ester group (on Glu[5] and Pro[24]), it is possible to eliminate all protective groups, including the trityl radical, by means of aqueous trifluoroacetic acid. In the decapeptide derivative tertiary-butyloxycarbonyl-L - seryl - L - tyrosyl - L - seryl-L-methionyl-γ-tertiary-butyl - L - glutamyl - L - histidyl - L-phenylalanyl-L-arginyl - L - tryptophyl - glycine used the imino group of the histidine radical is accordingly protected by a trityl group. The new decapeptide derivative is obtained for example when tertiary butyloxy carbonyl-L-seryl-L-tyrosyl - L - seryl - L - methionine azide is condensed with γ - tertiary butyl) - L - glutamyl-$N^{im}$-trityl-L-histidyl-L-phenylalany - L - arginy - L - tryptophyl - glycine (cf. Tables 4, 5 and 6, where Z represents the carbobenzoxy group and T the trityl radical).

TABLE 3

|  |  |  |  |
|---|---|---|---|
| Z–[Lys Pro Val Gly]–OH (BOC on Lys) | H–[Lys Lys]–OCH₃ (BOC BOC) | Z–[Arg]–OH  Z–[Arg]–OH  H–[Pro]–OCH₃ | Z–[Val]–OH  Z–[Lys]–OH (BOC)  Z–[Val Tyr]–OCH₃  H–[Pro]–OtBu |
| Z–[Lys Pro Val Gly  Lys Lys]–OCH₃ (BOC on Lys; BOC BOC) | | Z–[Arg  Pro]–OCH₃ | Ż–[Val Tyr]–NH–NH₂ (N₃) |
| Z–[Lys Pro Val Gly  Lys Lys]–NH–NH₂ (BOC; BOC BOC) | | H–[Arg  Pro]–OCH₃ | Z–[Val Tyr  Pro]–OtBu |
| | | Z–[Arg  Arg  Pro]–OCH₃ | H–[Val Tyr  Pro]–OtBu |
| | | Ż–[Arg  Arg  Pro]–OH | Z–[Lys  Val Tyr  Pro]–OtBu (BOC) |
| | | | H–[Lys  Val Tyr  Pro]–OtBu (BOC) |
| | | | Z–[Val  Lys  Val Tyr  Pro]–OtBu (BOC on Lys) |
| | | | H–[Val  Lys  Val Tyr  Pro]–OtBu (BOC on Lys) |
| | | Z–[Arg  Arg  Pro  Val  Lys  Val Tyr  Pro]–OtBu (BOC on Lys) | |
| | | H–[Arg  Arg  Pro  Val  Lys  Val Tyr  Pro]–OtBu (BOC on Lys) | |
| Z–[Lys Pro Val Gly  Lys Lys  Arg  Arg  Pro  Val  Lys  Val Tyr  Pro]–OtBu (BOC; BOC BOC; BOC on Lys) | | | |
| H–[Lys Pro Val Gly  Lys Lys  Arg  Arg  Pro  Val  Lys  Val Tyr  Pro]–OtBu (BOC; BOC BOC; BOC on Lys) | | | |

TABLE 4

|  |  |  |  |  |
|---|---|---|---|---|
| BOC–[Ser Tyr Ser Met]–N₃ | Z–[Glu His]–N₃ (OtBu; T) | Z–[Phe]–OH | Z–[Arg]–OH | H–[Try Gly]–OCH₃ |
| | | | Z–[Arg  Try Gly]–OCH₃ | |
| | | | H–[Arg  Try Gly]–OCH₃ | |
| | | Z–[Phe  Arg  Try Gly]–OCH₃ | | |
| | | H–[Phe  Arg  Try Gly]–OCH₃ | | |
| | Z–[Glu His  Phe  Arg  Try Gly]–OCH₃ (OtBu; T) | | | |
| | Z–[Glu His  Phe  Arg  Try Gly]–OH (OtBu; T) | | | |
| | H–[Glu His  Phe  Arg  Try Gly]–OH (OtBu; T) | | | |
| BOC–[Ser Tyr Ser Met  Glu His  Phe  Arg  Try Gly]–OH (OtBu; T) | | | | |

TABLE 5

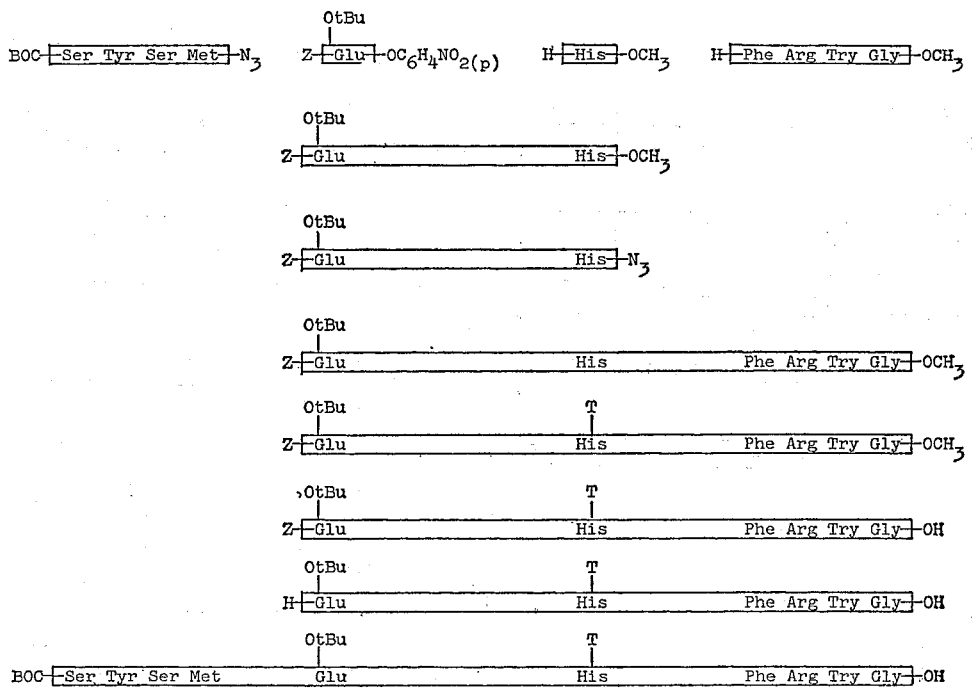

TABLE 6

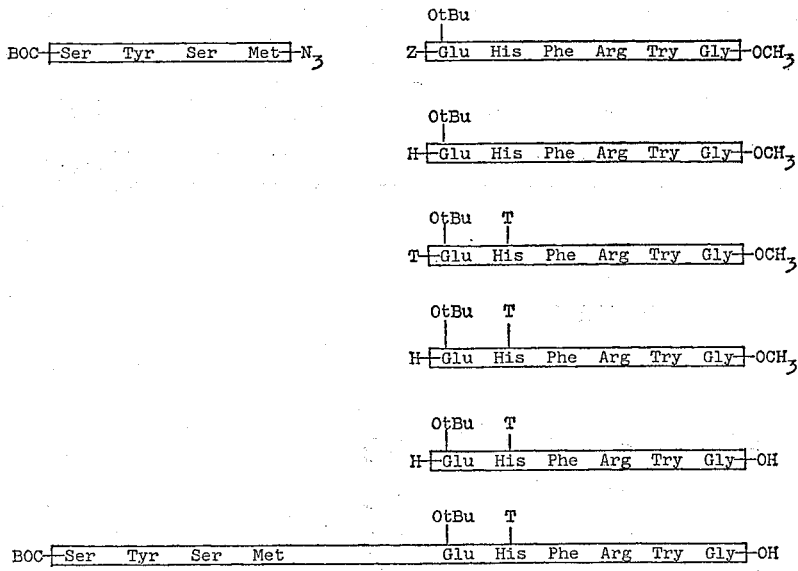

The resulting decapeptide derivative can be condensed according to the carbodiimide method, or by the mixed anhydrides method, with the tetradecapeptide derivative $N^\epsilon$-tertiary-butyloxycarbonyl - L-lysyl - L-prolyl-L-valyl-glycyl-tertiary - butyloxycarbonyl - L-lysyl - tertiary-butyloxycarbonyl - L-lysyl-L-arginyl - L-arginyl - L-prolyl-L-valyl - tertiary - butyloxycarbonyl - L-lysyl - L-valyl-L-tyrosyl - L-proline - tertiary butyl ester to yield the tetracosapeptide ester tertiary - butyloxycarbonyl - L-seryl-L-tyrosyl - L-seryl - L-methionyl - γ-tertiary-butyl-L-glutamyl-$N^{im}$-trityl - L-histidyl - L-phenylalanyl - L-arginyl-L-tryptophyl - glycyl - $N^\epsilon$-tertiary-butyloxycarbonyl-L-lysyl-L-prolyl - L-valyl-glycyl - tertiary - butyloxy-carbonyl-L-lysyl - tertiary - butyloxycarbonyl - L-lysyl - L-arginyl-L-arginyl-L-prolyl - L - valyl-tertiary-butyloxy-carbonyl-L-lysyl-L-valyl-L-tyrosyl - L-proline - tertiary butyl ester.

From the latter product the free tetracosapeptide can be prepared by eliminating the protective groups with aqueous trifluoracetic acid (50 to 90% strength).

The tetracosapeptide is also obtained, for example, by condensing the tetrapeptide L-seryl-L-tyrosyl - L-seryl-L-methionine with the eicosa peptide L-glutamyl-(or glutaminyl) - L-histidyl - L-phenylalanyl - L-arginyl - L-tryptophyl - glycyl - L-lysyl - L-prolyl - L-valyl-glycyl-L-lysyl-L-lysyl - L-arginyl - L-arginyl - L-prolyl-L-valyl-L-lysyl - L-valyl - L-tyrosyl - L-proline, for example as shown in the Table 7.

TABLE 7

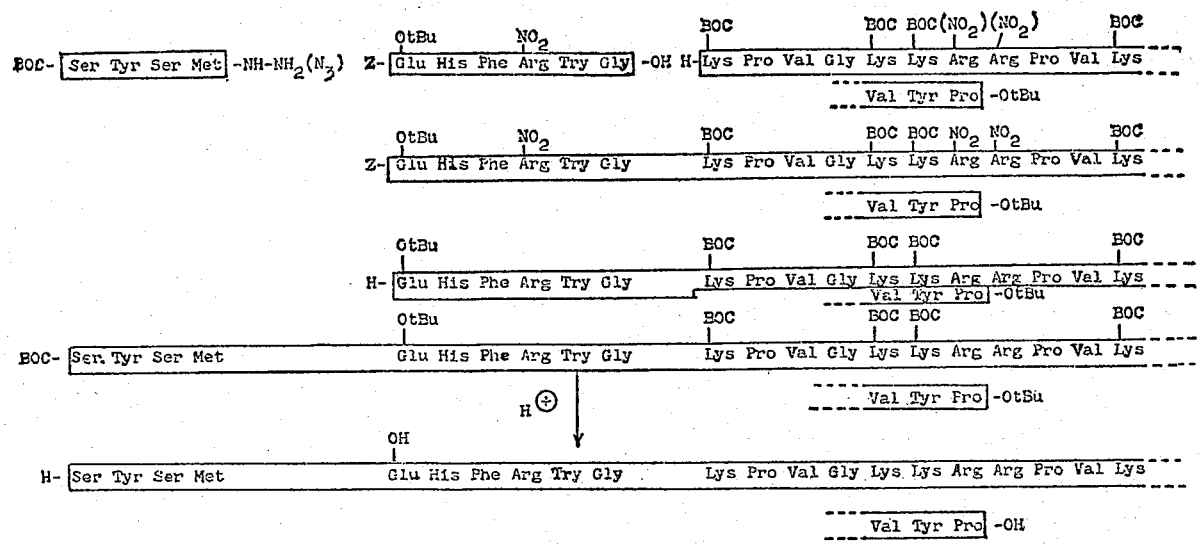

The tetrapeptide derivative used as starting material can be prepared by the processes described in the aforementioned U.S. patent application No. 114,636, filed June 5, 1961 by R. Schwyzer et al. and now U.S. Patent 3,256,526 or in U.S. patent application No. 343,228, filed Feb. 7, 1964 by R. Schwyzer et al. and now abandoned and the hexapeptide by the process of U.S. patent application No. 114,609, filed June 5, 1961 by R. Schwyzer et al. and now U.S. Patent 3,247,180, or also by the process described in U.S. patent application No. 343,228, filed Feb. 7, 1964 by R. Schwyzer et al. and now abandoned.

Any free functional groups not participating in the reaction are advantageously protected, more especially by hydrolyzing or reducing radicals that are easy to eliminate, thus the carboxyl group preferably by esterification (for example with methanol, tertiary butanol, a benzyl alcohol or para-nitrobenzyl alcohol), the amino group for example by introducing the tosyl or trityl radical or the carbobenzoxy group or a colored protective group, such as the para-phenylazo-benzyloxy-carbonyl group or the para-(para'-methoxy-phenylazo) - benzyloxy-carbonyl group or more especially the tertiary butyloxy-carbonyl radical. For protecting the amino group in the guanido grouping of arginine the nitro group may be used, but it is not absolutely necessary to protect the aforementioned amino group of arginine during the reaction.

The conversion of a protected amino or imino group into a free group and the conversion of a functionally converted carboxyl group into a free carboxyl group in the course of the process used for the manufacture of the tetracosapeptides and intermediates is carried out in the known manner by treatment with a hydrolysing or reducing agent respectively.

The invention further includes any variant of the process in which an intermediate obtained at any stage of the process is used as starting material and the remaining step or steps is/are carried out or the process is terminated at any stage thereof, and it includes also the intermediates thus obtained.

Depending on the reaction conditions used the new compounds are obtained in the form of bases or of their salts. From the salts the bases can be prepared in known manner. When the bases are reacted with acids suitable for forming therapeutically acceptable salts, there are obtained salts such, for example, as those of inorganic acids such as hydrohalic acids, for example hydrochloric or hydrobromic acid, perchloric, nitric or thiocyanic acid, sulfuric or phosphoric acids or organic acids such as formic, acetic, propionic, glycollic, lactic, pyruvic, oxalic, malonic, succinic, maleic, fumaric, malic, tartaric, citric, ascorbic, hydromaleic, dihydroxymaleic, benzoic, phenylacetic, 4-aminobenzoic, 4-hydroxybenzoic, anthranilic, cinnamic, mandelic, salicylic, 4-amino-salicylic, 2-phenoxybenzoic, 2-acetoxy-benzoic, methanesulfonic, ethanesulfonic, hydroxyethanesulfonic, benzenesulfonic, para-toluenesulfonic, naphthalenesulfonic or sulfanilic acid.

The tetracosapeptides obtained by the present process can be used in the form of pharmaceutical preparations containing the peptide in admixture with an organic or inorganic pharmaceutical excipient suitable for enteral or parenteral administration. Suitable excipients are substances that do not react with the polypeptides such, for example, as gelatine, lactose, glucose, sodium chloride, starches, magnesium stearate, talc, vegetable oils, benzyl alcohols, gums, poly-alkyleneglycols, white petroleum jelly, cholesterol or other known medicinal excipients. The pharmaceutical preparations may be, for example, tablets, dragees, ointments, powders, creams or suppositories, or in liquid form solutions, suspensions or emulsions. They may be sterilized and/or may contain assistants such as preserving, stabilizing, wetting or emulsifying agents. They may further contain other therapeutically useful substances.

The following examples illustrate the invention.

For paper chromatography the following systems were used:

System 40: n-butanol+ethanol+water (2:2:1)
System 43: tertiary amyl alcohol+isopropanol+water (100:40:55)
System 45: secondary butanol+3% ammonia (100:44)
System 49: secondary butanol+triethylamine+diethyl-barbituric acid+water+isopropanol (100:0.8:1.8 g.: 60:10)
System 52: n-butanol+acetic acid+water (100:10:30)
System 53: n-butanol+formic acid+water (480:6:314)
System 54: secondary butanol+isopropanol+monochloracetic acid+water (70:10:3 g.:40)
System 56: secondary butanol+isopropanol+5% veronal sodium in water (100:15:10:60)
System 87: isopropanol+formic acid+water (400:20:60)
System 100: ethyl acetate+pyridine+acetic acid+water (60:20:6:1)
System 101: n-butanol+pyridine+acetic acid+water (30:20:6:24)
System 102: ethyl acetate+methylethyl ketone+formic acid+water (50:30:10:10).

EXAMPLE 1

PZ-Lys-(BOC)-Pro-Val-Gly-NH-NH$_2$

A mixture of 1.15 grams (1.5 millimols) of PZ-Lys-(BOC)-Pro-Val-Gly-OCH$_3$ (U.S. patent application Ser. No. 46,893, filed Aug. 2,1960 by R. Schwyzer et al. and now U.S. Patent 3,264,279), 15 cc. of absolute methanol and 0.6 cc. of hydrazine hydrate is refluxed for one hour, evaporated to dryness and the hydrazide is precipitated with much ether. The initially gelatinous product solidifies when scratched with a glass rod. It is filtered off and thoroughly washed with ether on the suction filter. After drying over sulfuric acid there are obtained 1.1 grams of PZ-tetrapeptide hydrazide melting at 130 to 131° C.

A specimen recrystallized from acetonitrile has the melting point F=163–165° C. The hydrazide is readily soluble in cold acetic acid of 25% strength.

EXAMPLE 2

Z-Arg-(NO$_2$)-Pro-OCH$_3$ 3.06 grams (23.7 millimols) of proline methyl ester in 20 cc. of acetonitrile are added to a solution of 7.18 grams (20.3 millimols) of carbobenzoxy-nitro-L-arginine in 20 cc. of dimethylformamide. The mixture is cooled with ice and sodium chloride to about −5° to −10° C. and then treated with a solution of 4.9 grams of dicyclohexylcarbodiimide in 12 cc. of dimethylformamide: acetonitrile=1:1. The reaction solution is then diluted with 20 cc. of ice-cold acetonitrile and kept for 17 hours at 0° C. The urea formed is filtered off, washed with acetonitrile and the solution is treated with 5 drops of glacial acetic acid. After 30 minutes the whole is evaporated to dryness, the residue taken up in ethyl acetate, the precipitated urea is once more filtered off through cotton wool and the ethyl acetate solution is washed with 3× 10 cc. of N-hydrochloric acid, then twice with water and finally with N-sodium bicarbonate solution until, when the alkaline extracts are acidified, no turbidity appears; finally the whole is washed with water until neutral.

When the dried ethyl acetate solution is concentrated to a small volume, the carbobenzoxy dipeptide ester precipitates substantially quantitatively. Yield: 6.16 grams (65.5% of the theoretical). The product melts at 155 to 157° C. after having sintered at 153° C.

EXAMPLE 3

H-Arg-(NO$_2$)-Pro-OCH$_3$ 8.4 grams of Z-Arg(NO$_2$)-Pro-OCH$_3$ are dissolved with heating in 27 cc. of glacial acetic acid and then treated at room temperature with 27 cc. of approximately 4 N-hydrogen bromide solution in glacial acetic acid. After one hour the whole is concentrated in vacuum at 40° C. to a small volume and the decarbobenzoxy solution product is precipitated with much absolute ether. The initially tacky product is treated with absolute ether until it forms a fine powder. For purificaion the dihydrobromide of the dipeptide ester is once more precipitated from methanol+ether. The pale yellowish compound is taken up in 4 cc. of water, 150 cc. of chloroform are added and the mixture is cooled to 0° C. in an ice bath. While whirling the mixture vigorously, solid potassium carbonate is added in portions until all water has been consumed and the potassium carbonate separates in solid form; the latter is once more extracted with fresh chloroform and the combined chloroform extracts are dried over anhydrous potassium carbonate and filtered through a little Celite in a G$_4$ glass suction filter. After having evaporated the chloroform at 40° C. there are obtained 5.5 grams (=90% of the theoretical yield) of nitro-L-arginylproline methyl ester. The compound is further worked up as it is.

EXAMPLE 4

Z-Arg(NO$_2$)-Arg(NO$_2$)-Pro-OCH$_3$ 8.34 grams (25.2 millimols) of H-Arg(NO$_2$)-Pro-OCH$_3$ in 25 cc. of freshly distilled dimethylformamide are combined with a solution of 8.92 grams (25.2 millimols) of Z-Arg(NO$_2$)-OH, and the mixture is diluted with 50 cc. of aceto/nitrile and then cooled to −10° C. The whole is kept for 30 minutes at −10° C. and then treated while being stirred with a solution of 5.71 grams (27.7 millimols) of dicyclohexylcarbodiimide in 12.5 cc. of ice-cold acetonitrile and the whole is allowed to react for 22 hours at 0° C. The urea is filtered off and the filtrate is concentrated in vacuum to a small volume. The syrupy residue is taken up in chloroform, washed with 3× 10 cc. of N-hydrochloric acid, then with 2× 10 cc. of water and finally with N-sodium bicarbonate solution and N-sodium carbonate solution until, when the alkaline extracts are acidified, no more precipitate or turbidity appears. Finally, the chloroform extracts are washed neutral with water and dried over sodium sulfate and evaporated, to yield 10.4 grams (=62% of theory) of crude carbobenzoxy-tripeptide ester.

When a sample of the crude product is subjected to scission with 2 N-hydrogen bromide solution in glacial acetic acid for one hour at room temperature there appears in the paper chromatogram in the systems 54 and 49 apart from the tripeptide also a further amount of nitro-arginine and another by-product. For purification 4.6 grams of the crude product are crystallized from 140 cc. of butanol. Yield: 2.2 grams of pure carbobenzoxy-tripeptide ester melting at 120° C. with decomposition. Optical rotation $[\alpha]_D^{26}=-43.9°\pm1°$ (c.=1.032 in methanol).

The ultra-violet spectrum of the carbobenzoxy-tripeptide ester displays at 271 mμ the maximum typical of nitroarginine ($\epsilon$=32200).

EXAMPLE 5

H-Arg(NO$_2$)-Arg(NO$_2$)-Pro-OCH$_3$

A mixture of 2.19 grams (3.3 millimols) of Z-Arg(NO$_2$)-Arg(NO$_2$)-Pro-OCH$_3$ and 13.2 cc. of 2 N-hydrobromic acid solution in glacial acetic acid is decarbobenzoxylated for one hour at room temperature. The excess acid is evaporated and the decarbobenzoxylation product is precipitated with much absolute ether. The crude product is taken up in 2 cc. of water, extracted twice with fresh ethyl acetate, the ethyl acetate phases are once again washed with water and the combined aqueous solutions are poured over a column of ion-exchanger Merck II. The free tripeptide ester is eluted with 200 cc. of water and the water is then evaporated in vacuum at 40° C. Yield: 1.3 grams (=74% of the theoretical).

The paper chromatogram in the systems 43, 49 and 54 of the free tripeptide ester produces with ninhydrin only one positive spot each.

R$_f$ values: 43/0.42, 49/0.67 and 54/0.49.

EXAMPLE 6

T-Lys(BOC)-Lys(BOC)-Arg(NO$_2$)-Arg(NO$_2$)-Pro-OCH$_3$)

1.07 grams (2.01 millimols) of H-Arg(NO$_2$)-Arg(NO$_2$)-Pro-OCH$_3$ in 16.5 cc. of a 1:1-mixture of dimethylformamide and acetonitrile are cooled to −10° C. While stirring the mixture vigorously there are rapidly added 1.44 grams of T-Lys(BOC)-Lys(BOC)-OH (aforementioned U.S. patent application No. 46,893 and now U.S. Patent 3,264,279), the whole is diluted with 10 cc. of previously cooled acetonitrile and after 10 minutes 456 mg. (2.2 millimols) of dicyclohexylcarbodiimide in 5 cc. of ice-cold acetonitrile are added. The mixture is allowed to react for 20 hours at 0° C.; the urea is then filtered off and the filtrate is evaporated in vacuum at 40° C. The unreacted tripeptide ester is precipitated with much ethyl acetate and the ethyl acetate solution is then evaporated to dryness and the residue is taken up in a small amount of acetone. The mixture is filtered through cotton wool and the N-trityl-pentapeptide ester is precipitated with much ether.

A specimen of the trityl-pentapeptide ester split with anhydrous trifluoroacetic acid reveals in the paper chromatogram in the system 49, in addition to the pentapeptide methyl ester ($R_f=0.29$), a very small amount of the two starting materials [dipeptide-H-lys-lys-OH ($R_f=0.12$) and tripeptide ester nitro-arginyl-nitro-arginyl-proline methyl ester ($R_f=0.53$)].

For analysis 200 mg. of the product are subjected to a Craig distribution over 100 stages between methanol of 80% strength and a 1:1-mixture of chloroform and carbon tetrachloride. The bulk of the substance (180 mg.) is found in stages 16–28 which are combined and once more precipitated from acetone+ether. Melting point: 134–136° C. Optical rotation $[\alpha]_D^{26}=-41.20\pm0.4°$ (c.=2.709 in methanol). Ultra-violet spectrum: $\lambda_{max}$ 271 m$\mu$, $\epsilon=32500$, in absolute alcohol.

EXAMPLE 7

H-Lys(BOC)-Lys(BOC)-Arg(NO$_2$)-Arg(NO$_2$)-Pro-OCH$_3$)

1.46 grams (1.19 millimols) of N$^\alpha$-trityl-pentapeptide methyl ester (Example 6) in 50 cc. of acetic acid of 75% strength are subjected to splitting for 45 minutes at 30° C.; the acetic acid is then evaporated in a high vacuum at 30° C. and the residue is distributed between acetic acid of 1% strength and ether. On evaporation of the ethereal solution a quantitative yield of triphenylcarbinol is obtained. The acetic acid solution is likewise evaporated in a high vacuum at 40° C. and the residue distributed in a separating funnel between butanol and N-sodium carbonate solution. The pH value of the aqueous phase must be 8.5. The butanol extracts are washed with water until neutral and then dried over sodium sulphate. Yield: 1.03 grams (=88% of the theoretical).

The compound is used for further working up without first having been purified.

EXAMPLE 8

PZ-Lys(BOC)-Pro-Val-Gly-Lys(BOC)-Lys(BOC)-Arg(NO$_2$)-Arg(NO$_2$)-Pro-OCH$_3$

A mixture of 900 mg. (1.2 millimols) of PZ-Lys-(BOC)-Pro-Val-Gly-hydrazide and 10 cc. of dimethylformamide is cooled to −10° C. 4 cc. of N-hydrochloric acid are then slowly run in, whereupon 1.4 cc. of ice-cold N-sodium nitrite solution are vigorously stirred in dropwise at −10° C. After 30 seconds the azide begins to separate out as a sticky substance. The mixture is allowed to react for another 3 minutes at −10° C. and then treated with 150 cc. of ice water. The tacky azide, which is difficult to filter, is extracted with ice-cold ethyl acetate and the ethyl acetate phases are washed 3 times with water until neutral, then dried in the cold over magnesium sulfate and filtered through a cold G4-glass suction filter into an ice-cooled solution of 1.03 grams (about 1 millimol) of H-Lys(BOC)-Lys(BOC)-Arg(NO$_2$)-Arg(NO$_2$)-Pro-OCH$_3$. The mixture is allowed to react for 22 hours at 0° C. and then for 3 hours at 30° C. The reaction solution is washed with 40 cc. of water, then with 4× 10 cc. of acetic acid solution of 1% strength, then with 5× 10 cc. of N-sodium bicarbonate solution and finally with water and saturated sodium chloride solution. On evaporation of the dried solution the nonapeptide derivative settles out. Yield: 1.70 grams of crude product.

For purification 1.52 grams of the crude product are taken up in a small amount of chloroform and then filtered through a column of 45 grams of silica gel. One reprecipitation of the eluate from 10 cc. of chloroform with ether yields 1.06 grams of PZ-nonapeptide methyl ester, melting at 134 to 140° C. with decomposition.

In the thin-layer chromatogram (silica gel G; product of Merck) in the system dioxane: water=9:1 only one substance of $R_f$ value 0.75 can be identified. In the systems chloroform:acetone=7:3 and benzene:acetone=1:1 the compound remains at the starting point. The substance, crystallized from acetonitrile, melts at 136–138° C.; it exhibits in the UV-spectrum in ethanol maxima at $\lambda=272$ m$\mu$ ($\epsilon=26600$) and $\lambda=320$ m$\mu$ ($\epsilon=22400$).

EXAMPLE 9

PZ-Lys(BOC)-Pro-Val-Gly-Lys(BOC)-Lys(BOC)-Arg(NO$_2$)-Arg(NO$_2$)-Pro-OH

A mixture of 1.06 grams (0.62 millimols) of PZ-nonapeptide ester (Example 8), 6 cc. of dioxane of 75% strength and 1.24 cc. of 1.95 N-sodium hydroxide solution is hydrolyzed for 15 minutes at room temperature. The reaction solution is then poured into 110 cc. of ice water containing 2.5 cc. of N-hydrochloric acid and the floccular precipitate is filtered through a G3 glass suction filter. The precipitate is thoroughly washed with water and then dried over phosphorus pentoxide in a high vacuum to yield 970 mg. of an amorphous product. $R_f$ value in the thin-layer chromatogram=0.52 for dioxane:water=9:1.

200 mg. of the product distributed over 121 stages in the system methanol:water:chloroform:carbontetrachloride=8:2:5:5 yield 162 mg. of the pure peptide derivative of K-value=0.65.

Ultra-violet spectrum in absolute alcohol: $\lambda_{max}$ 320 m$\mu$ ($\epsilon=21700$) and 271 m$\mu$ ($\epsilon=37200$).

The substance, crystallized from acetonitrile, melts at 140–145° with decomposition.

EXAMPLE 10

PZ-Val-Lys(BOC)-OH

A mixture of 4.75 grams (13.4 millimols) of PZ-valine and 65 cc. of absolute dioxane is cooled in ice water in a manner such that part of the dioxane is solid. There are then added 3.45 cc. (14.4 millimols) of N-tributylamine and after another 5 minutes 1.38 cc. (13.4 millimols) of chloroformic acid ethyl ester and the whole is allowed to react for 15 minutes while being cooled.

4 grams (17.2 millimols) of N$^\epsilon$-BOC-lysine are slowly stirred into 32 cc. of water containing 2.45 cc. (17.2 millimols) of N-triethylamine. The last portions of N$^\epsilon$-BOC-lysine do not dissolve readily. On cooling with ice a small amount of solid matter separates again from the aqueous solution. This solution is rapidly added with vigorous stirring and cooling to the freshly prepared solution of the mixed anhydride and the mixture is allowed to react for 30 minutes at room temperature. The reaction solution is concentrated in vacuum at 40° C. to a small volume and then treated, while being cooled with ice, with 100 cc. of water and 40 cc. of citric acid solution of 10% strength. When the smeary precipitate is rubbed with ether it turns solid. The crude PZ-valyl-N$^\epsilon$-BOC-lysine is filtered off, washed copiously with water and ether and dried in a high vacuum at 50° C. Yield: 4.41 grams. Melting point: 167–169° C. (after sintering at 165° C.).

The ethereal phase is separated and dried over sodium sulfate. When the ether is evaporated, another 1.07 grams of the PZ-dipeptide separate; melting point 167–169° C.

The total yield amounts to 5.48 grams (=70% of the theoretical). After having been crystallized once from ethyl acetate the analytical fraction melts at 167–169° C.

The ultra-violet spectrum in absolute alcohol displays maxima at 230 m$\mu$ ($\epsilon=13400$) and at 322 m$\mu$ ($\epsilon=23000$)

EXAMPLE 11

Z-Val-Tyr-Pro-OtBu 11.25 grams (27.4 millimols) of carbobenzoxy-valyltyrosine (U.S. Patent No. 2,978,444, granted Apr. 4, 1961) in 100 cc. of freshly distilled acetonitrile are mixed with a solution of 4.65 grams (27.4 millimols) of proline tertiary butyl ester in 25 cc. of acetonitrile and cooled in an ice bath to 0° C. A solution of 6.21 grams of dicyclohexylcarbodiimide in 10 cc. of cold acetonitrile is then added and the mixture is allowed to react for 15 hours at 0° C. The urea which crystallizes out is filtered off (yield: 90% of the theoretical) and the reaction solution is mixed with 1 cc. of glacial acetic acid. After 15 minutes the acetonitrile is evaporated in vacuum, the residue is taken up in ethyl acetate and the precipitated urea is once more filtered off. The ethyl acetate solution is extracted with 2× 10 cc. of ice-cold 2 N-hydrochloric acid, and then with 2 N-sodium carbonate solution until an acidified sample no longer produces a precipitate, and finally with water until neutral. The ethyl acetate extracts are dried over sodium sulfate and evaporated under diminished pressure. Yield: 14.1 grams (=88% of the theoretical) of amorphous carbobenzoxy-tripeptide ester.

This carbobenzoxy-tripeptide ester is readily soluble in most organic solvents except ether, petroleum ether and benzene. It is further worked up without first having been purified.

EXAMPLE 12

H-Val-Tyr-Pro-OtBu 14.13 grams (24.9 millimols) of Z-Val-Tyr-Pro-OtBu in 250 cc. of methanol of 90% strength containing 4.5 cc. of glacial acetic acid are subjected to hydrogenolytic splitting in the presence of 2 grams of palladium-carbon catalyst of 10% strength. The liberated carbon dioxide is absorbed with potassium hydroxide solution in a second interposed duck-shaped hydrogenation vessel. After 2 hours no more hydrogen is being taken up. The catalyst is filtered off and the filtrate is evaporated to dryness in vacuum at 40° C.; the residue is distributed between 200 cc. of ethyl acetate and 2× 20 cc. of ice-cold 2 N-sodium carbonate solution. The sodium carbonate solutions are once more extracted with fresh ethyl acetate and the ethyl acetate extracts are washed with water until neutral and then dried over sodium sulfate. Evaporation in vacuum yields 7.69 grams (=71% of theory) of the free tripeptide ester.

In the paper chromatogram in the systems 43, 45 and 54 the tripeptide ester migrates with the solvent front and produces with ninhydrin and Pauly reagent one spot each.

EXAMPLE 13

PZ-Val-Lys(BOC)-Val-Tyr-Pro-OtBu

A solution of 10.36 grams (17.7 millimols) of PZ-Val-Lys(BOC)-OH and 7.69 grams (17.7 millimols) of H-Val-Tyr-Pro-OtBu in 140 cc. of freshly distilled dimethylformamide is treated at 0° C. with 4.2 grams of dicyclohexylcarbodiimide (15% excess) in 12 cc. of dimethylformamide, and the whole is kept for 2 days at 0° C. The urea is filtered off and the filtrate mixed with 0.5 cc. of glacial acetic acid and left to itself for another 30 minutes. The solvent is then evaporated in vacuum to leave a small volume and the syrupy residue is taken up in much ethyl acetate. The ethyl acetate phase is washed with 4× 25 cc. of 0.2 N-ammonium hydroxide solution, 2× 30 cc. of water, 2× 30 cc. of ice-cold citric acid solution of 10% strength and finally with water until it is neutral. After drying with sodium sulfate and evaporating the solvent there are obtained 17 grams of crude amorphous reaction product. For purification the crude product is dissolved in 100 cc. of chloroform and the solution is poured over a silica gel column (570 grams; diameter 5.6 cc., 41 cm. high) disactivated with 10% of water. On elution with chloroform the orange-red zone migrates slowly, whereas with 2:1 chloroform+ethyl acetate 2 fractions can be eluted.

The first fraction (4.8 grams) is still considerably contaminated with dicyclohexylurea and PZ-dipeptide and can be crystallized from acetonitrile only in a poor yield, whereas the second fraction (7.2 grams) is again obtained as a gelatinous precipitate from 200 cc. of acetonitrile. Yield: 5.1 grams of PZ-pentapeptide ester melting at 154–158° C.

The analytically pure fraction, obtained by a further crystallization, melts at 157–159° C.

The ultra-violet spectrum of the compound in absolute alcohol displays maxima at 227 m$\mu$ ($\epsilon$=20700) and 322 m$\mu$ ($\epsilon$=21100).

In the thin-layer chromatogram (silica gel G; product of Merck) the $R_f$-values revealed are:

0.23 (chloroform+acetone 95:5) and
0.60 (benzene+acetone 1:1).

EXAMPLE 14

H-Val-Lys(BOC)-Val-Tyr-Pro-OtBu

A mixture of 1.4 grams of PZ-Lys(BOC)-Val-Tyr-Pro-OtBu, 100 cc. of methanol and 400 mg. of palladium carbon catalyst of 10% strength is shaken for 6 hours in an autoclave with hydrogen under 5 atmospheres pressure. The catalyst is filtered off, repeatedly washed with methanol and the solvent is evaporated in vacuum. The residue is triturated with much ether and dried in a high vacuum. 980 mg. of a fine, amorphos powder is obtained.

In the systems 54 and 49 the compound migrates with the solvent front.

The $R_f$ value is 0.65 in the thin-layer chromatogram (silica gel G) in the system dioxane+water 9:1.

EXAMPLE 15

PZ-Lys(BOC)-Pro - Val - Gly - Lys(BOC) - Lys(BOC)-Arg(NO$_2$)-Arg(NO$_2$) - Pro - Val - Lys(BOC)-Val-Tyr-Pro-OtBu 276 mg. (0.16 millimol) of PZ-Lys-Pro-Val-Gly-Lys(BOC)-Lys(BOC) - Arg(NO$_2$) - Arg(NO$_2$) - Pro-OCH$_3$ (dried over phosphorus pentoxide in a high vacuum at 80° C.) are dissolved in a mixture of 1 cc. of absolute dimethylformamide and 2 cc. of absolute tetrahydrofuran and the whole is cooled to −10° C. in a cooling bath of ice and sodium chloride. 0.16 millimol of triethylamine in 1.6 cc. of tetrahydrofuran is then added and after 5 minutes 0.16 millimol of chloroformic acid isobutyl ester in 1.6 cc. of absolute tetrahydrofuran is introduced. The whole is allowed to react in the cooling bath for 15 minutes and then treated with a solution of 140 mg. of H-Val-Lys(BOC)-Val-Tyr-Pro-OtBu in 2 cc. of absolute tetrahydrofuran, stirred for 15 minutes in an ice bath and then for 1 hour at room temperature; the solvent is then evaporated in vacuum at 40° C. and the reaction product is precipitated with much ether. The dried crude product (395 mg.) in 4 cc. of alcohol-free chloroform is poured over a column of alumina (activity III; 40 grams) and eluted with 100 cc. of chloroform. The yellow zone containing the peptide derivative migrates slowly. The whole is then eluted with 80 cc. of chloroform+methanol 95:5, to yield 290 mg. of chromatographically unitary product. $R_f$ value (dioxane+water 9:1)=0.75 in the thin-layer chromatogram.

The substance melts, when crystallized from acetonitrile, at 160–165° C. The UV-spectrum in ethanol exhibits maxima at $\lambda$=272 m$\mu$ ($\epsilon$=36800) and 319 m$\mu$ ($\epsilon$=20400).

EXAMPLE 16

H-Lys(BOC)-Pro-Val-Gly - Lys(BOC) - Lys(BOC)-Arg-Arg-Pro-Val-Lys(BOC)-Val-Tyr-Pro-OtBu, 3 CH$_3$COOH

A mixture of 320 mg. of PZ-tetradekapeptide tertiary butyl ester (Example 14), 6 cc. of acetic acid of 90% strength and 100 mg. of palladium-carbon catalyst of 10% strength is shaken for 5 hours with hydrogen under a pressure of 5 atmospheres (gauge). The reaction solution is then poured into a duck-shaped hydrogenation vessel and shaken for another 17 hours with 100 mg. of fresh palladium catalyst under normal conditions. To absorb the carbon dioxide formed, another duck-shaped hydrogenation vessel filled with potassium hydroxide solution is interposed. The catalyst is then filtered off and thoroughly washed with acetic acid of 90% strength and with methanol, and the whole is evaporated to dryness in vacuum to yield 220 mg. of a white amorphous powder.

The ultra-violet spectrum in absolute alcohol displays at 278 mμ the maximum ($\epsilon$=1500) typical of tyrosin.

In the paper-chromatogram in the systems 49, 50 and 54 the compound migrates with the solvent front and produces positive reactions with ninhydrin and Pauly and Sakaguchi reagents.

EXAMPLE 17

BOC-Ser-Tyr-Ser-Met-Glu(O-tBu) - His - Phe - Arg-Try-Gly-Lys(BOC)-Pro-Val - Gly - Lys(BOC)-Lys(BOC)-Arg-Arg-Pro-Val-Lys(BOC)-Val-Tyr-Pro-OtBu 210 mg. of tetradecapeptide tertiary butyl ester (Example 16) are rapidly dissolved at 0° C. in 10 cc. of 0.1 N-hydrochloric acid and the resulting solution is subjected to lyophilization in a high vacuum. The fine, white residue is then further dried for 2 hours at 50° C. in a high vacuum over phosphorous pentoxide. At the same time, 160 mg. (0.11 millimol) of BOC-Ser-Tyr-Ser-Met-Glu(OtBu)-His-Phe-Arg-Try-Gly - OH (afore-mentioned pat. appln. No. 114,636, now U.S. Patent 3,256,526) are dissolved with heating in 1 cc. of freshly distilled dimethylformamide, cooled to room temperature and added to the trihydrochloride of the tetradekapeptide, then diluted with another 2.5 cc. of dimethylformamide, and after 10–15 minutes a clear solution is obtained, which is kept for 2 hours in an ice bath. 42 mg. (0.2 millimol) of dicyclohexylcarbodiimide in 0.6 cc. of ice-cold acetonitrile are then added, and the mixture is allowed to react for 13 hours at 0° C. and then for 48 hours at room temperature. The crude reaction product is then precipitated with much ethyl acetate and dried in a high vacuum at 40° C. Yield fo crude product: 330 mg.

EXAMPLE 18

(1) L-Proline-tertiary butyl ester (a) *Hydrochloride.*—A mixture of 5 g. of L-proline, 150 ml. of dry, alcohol-free chloroform, 5 ml. of very pure concentrated sulfuric acid and 150 ml. of liquid isobutylene is shaken at room temperature in an autoclave until all has dissolved (about 3 to 4 days). The batch is cooled to −15° C., the autoclave opened and the isobutylene is distilled off under vacuum with exclusion of moisture. The residue chloroform solution is washed with 200 ml. of potassium carbonate solution of 20% strength while being cooled with ice and then dried with sodium sulfate. After having suctioned off the sodium sulfate, the amount of L-proline tertiary butyl ester present in the chloroform solution is determined by titration of a specimen with dilute hydrochloric acid. The remainder of the chloroform solution is then cooled to −15° C. and the accurately calculated amount of alcoholic hydrochloric acid is added. The whole is evaporated and the residue triturated with ether, to yield 6.88 (=76% of the theoretical) of crystalline L-proline tertiary butyl ester hydrochloride melting at 107–108° C. The product is extremely hygroscopic.

(b) *Free ester.*—For conversion into the free ester the hydrochloride is dissolved in a minimum of water, and the solution is covered with a large amount of ether and strongly alkalized with concentrated potassium carbonate solution. The ester, which is thus caused to settle out, is taken up in the ether. On drying and evaporation the ether solution yields oily L-proline tertiary butyl ester which may be further worked up as it is.

(2) Carbobenzoxy-L-valyl-L-tyrosine azide 12.9 g. (=0.3 mol) of carbobenzoxyl-L-valyl-L-tyrosine hydrazide (H. Schwarz, F. M. Bumpus and I. H. Page, J. Am. Chem. Soc. 79, page 5697 [1957]) are dissolved in a mixture of 600 ml. of 2 N-hydrochloric acid and 1200 ml. of dimethylformamide, cooled to −15° C., and 70 ml. of a 5 N-aqueous solution of sodium nitrite are stirred in. The solution is stirred for another 5 minutes at −10° C. and then poured into a large amount of ice water. The precipitated azide is filtered off, dissolved in cold ethyl acetate, and the solution is washed at 0° C. with saturated sodium bicarbonate solution and ice water, dried for a short time over magnesium sulfate and used for the further reaction as it is.

(3) Carbobenzoxy-L-valyl-L-tyrosyl-L-proline tertiary butyl ester 51.5 g. of L-proline-tertiary butyl ester are dissolved in the solution of carbobenzoxy-L-valyl-L-tyrosine azide (prepared as described under (2) above) in about 2.9 liters of ethyl acetate cooled to 0° C., and the whole is kept in the dark for 5 hours at 0° C. and then for 15 hours at 22° C. The reaction mixture is then concentrated to half its volume in a 5-liter flask at 40° C.; this causes the precipitation of crystalline carbobenzoxy - L - valyl-L-tyrosyl-L-proline tertiary butyl ester which is filtered off through a glass frit, washed successively with a small amount of ethyl acetate, 50 ml. of benzene and 75 ml. of benzene+petroleum ether 1:1, and finally dried under vacuum at 55° C. Yield: 79.5 g. Melting point 173–175° C. The filtrate (volume about 1.5 liters) is cooled in a separating funnel and washed at 0° C. with 2× 450 ml. of critic acid solution of 10% strength, with 3× 300 ml. of saturated sodium chloride solution, with 2× 250 ml. of saturated sodium bicarbonate solution and finally with 3×150 ml. of water. The ethyl acetate phase is mixed with 200 ml. of benzene, evaporated to dryness, another 100 ml. of benzene are added, and the whole is once more evaporated to dryness. The residue is dissolved with heating in 25 ml. of acetonitrile; 45 ml. of benzene are added, and the mixture is seeded and allowed to crystallize overnight at 0° C. The precipitate is filtered off, washed with a small amount of benzene and then with petroleum ether and dried under vacuum at 55° C. Yield: 29 g. Melting point 163–167° C. When this product (29 g.) is recrystallized once from 430 ml. of hot acetonitrile, there are obtained 19.2 g. of pure material melting at 173–175° C., and, by working up the remaining mother liquor, another 3 g. melting at 172–173° C. Paper chromatography: after 1 hour at 40° C. with concentrated hydrochloric acid; 200γ on Whatman paper No. 1, staining with ninhydrin and Pauly reagent: $R_f(40)$=0.65; $R_f(45)$=0.48.

(4) L-valyl-L-tyrosyl-L-proline tertiary butyl ester 28.35 g. of carbobenzoxy-L-valyl-L-tyrosyl-L-proline tertiary butyl ester (melting at 173–175° C.) are suspended in 250 ml. of distilled methanol; 3 g. of palladium black of 10% strength are added, and the mixture is hydrogenated in a duck-shaped shaking vessel while absorbing the carbon dioxide formed. Hydrogen absorption ceases after less than 2 hours; after a total of 4 hours the catalyst is filtered off through a G4-suction filter and washed with 25 ml. of methanol. The clear, colorless solution is concentrated under vacuum and dried at 45° C. The amorphous, foamy mass is finely powdered and dried under a high vacuum at 45° C. until its weight remains constant. Yield: 21.3 g. (=98.5% of the theoretical) of chromatographically pure L-valyl-L-tyrosyl-L-proline tertiary butyl ester melting unsharply at about 100° C. $[\alpha]_D$=−47.4° C. (c.=2 in methanol). Paper chromatography: Product as obtained, or after having been hydrolysed with concentrated hydrochloric acid, for 1 hour at 40° C.; 200γ on Whatman Paper No. 1, staining with ninhydrin and Pauly reagent: $R_f(40)$=0.87;

$R_f(45)=0.92$; after treatment with hydrochloric acid $R_f(40)=0.65$; $R_f(45)=0.48$.

(5) *Carbonbenzoxy-$N^\epsilon$-tertiary butloxycarbonyl-L-lysyl-L-valyl-L-tyrosyl-L-proline tertiary butyl ester*

A solution of 19.15 g. of carbobenzoxy-$N^\epsilon$-tertiary butyloxycarbonyl-L-lysine and 21.8 g. of L-valyl-L-tyrosyl-L-proline tertiary butyl ester in 200 ml. of distilled acetonitrile is mixed at 20° C. with 11.4 g. of solid dicyclohexycarbodiimide which is stirred in one lot. The carbodiimide dissolves immediately and at the same time dicyclohexyl urea crystallizes out. At the beginning, the batch is cooled for a short time with ice to prevent the temperature rising above 25° C., then stirred for 3 hours at room temperature and allowed to stand overnight. 1 ml. of glacial acetic acid is added, the mixture is stirred for 30 minutes at room temperature and then for 30 minutes at 0° C., and the dicyclohexyl urea which has settled out is filtered off. On evaporation to dryness, the filtrate furnishes 44.3 g. of an amorphous powder which is dissolved with heating in 44.3 ml. of ethyl acetate, and then precipitated again by adding 221 ml. of petroleum ether. The solvent is decanted and the powdered precipitate dried at 45° C. under a high vacuum, to yield 37.94 g. of carbobenzoxy-$N^\epsilon$-tertiary butyloxycarbonyl-L-lysyl-L-valyl-L-tyrosyl-L-proline tertiary butyl ester melting at about 100° C. The product is hydrogenated as it is.

$[\alpha]_D = -62.3° C. \pm 0.5° C.$ (c.=1.98 in methanol). Paper chromatography: after 1 hour at 40° C. with concentrated hydrochloric acid. 200γ on Whatman Paper No. 1, staining with ninhydrin and Pauly reagent: $R_f(40)=0.40$; $R_f(45)=0.28$.

(6) *$N^\epsilon$-tertiary butyloxycarbonyl-L-lysyl-L-valyl-L-tyrosyl-L-proline tertiary butyl ester*

A solution of 37.37 g. of carbobenzoxy-$N^\epsilon$-tertiary butyloxycarbonyl-L-lysyl-L-valyl-L-tyrosyl-L-proline tertiary butyl ester in 200 ml. of methanol is mixed with 3 g. of palladium black of 10% strength and the whole is hydrogenated in a duck-shaped shaking vessel while absorbing the liberated carbon dioxide. After about 6 hours hydrogen is no longer being absorbed. The catalyst is filtered off through a G4-frit, rinsed with methanol, and the filtrate is evaporated to dryness. The product is powdered and dried under a high vacuum at 45° C., to yield 29.68 g. of chromatographically unitary $N^\epsilon$-tertiary butyloxycarbonyl-L-lysyl-L-valyl-L-tyrosyl-L-proline tertiary butyl ester melting at 95–100° C. $[\alpha]_D = -61.8° C. \pm 0.5°$ C. (c.=2.0 in methanol). Paper chromatography: 200γ on Whatman Paper No. 1, staining with ninhydrin and Pauly reagent: $R_f(40)=0.86$.

(7) *Carbobenzoxy-L-valyl-N-tertiary butyloxycarbonyl-L-lysyl-L-valyl-L-tyrosyl-L-proline-tertiary butyl ester*

8.73 g. of carbobenzoxy-L-valine and 5.09 ml. of triethylamine are dissolved in 85 ml. of absolute ethyl ester in a three-necked flask equipped with stirrer, dropping funnel, thermometer, and calcium chloride tube, and the solution is cooled to —10° C. While continuing cooling at —10° C. 4.57 ml. of isobutyl chlorocarbonate are stirred in dropwise within about 1½ minutes. The whole is rinsed with 12 ml. of ethyl acetate and stirred on for 15 minutes at —10° C. A solution of 21.92 g. of $N^\epsilon$-tertiary butyloxycarbonyl-L-lysyl-L-valyl-L-tyrosyl-L-proline tertiary butyl ester in 50 ml. of absolute ethyl acetate is then added dropwise during 5 minutes at —5° C. and rinsed with 15 ml. of ethyl acetate. The mixture is stirred for 30 minutes at 0° C., the temperature is then allowed to rise to 20° C., and the batch is stirred 1 hour longer at room temperature. For working up, 170 ml. of water are added, and the batch is extracted with 270 ml. of ethyl acetate. The ethyl acetate solution is successively washed with 85 ml. of tartaric acid of 10% strength at 0° C., with 85 ml. of water, with 2× 100 ml. of sodium bicarbonate solution, and with 2× 100 ml. of dilute sodium sulfate solution. The reaction mixture is kept over magnesium sulfate and evaporated to dryness; when the product is powdered and dried at 45° C., it yields 29.98 g. of an amorphous crude product which is dissolved with heating in 300 ml. of acetonitrile, seeded and allowed to cool while being stirred, then kept at room temperature. The crystalline precipitate is filtered off and dried at 45° C. under vacuum. Yield: 23.55 g. of carbobenzoxy-L-valyl-$N^\epsilon$-tertiary butyloxycarbonyl - L - lysyl-L-valyl-L-tyrosyl-L-proline tertiary butyl ester melting at 159–164° C. which for purification is stirred again for 3 minutes in 235 ml. of boiling acetonitrile. The batch is kept overnight at room temperature, filtered, and the residue is washed with 70 ml. of acetonitrile and dried at 45° C. under a high vacuum, to yield 22.55 g. of pure product melting at 162–165° C. $[\alpha]_D = -71.4° C. \pm 1°$ C. (c.=0.9 in methanol). Paper chromatography: after 1 hour at 40° C. in concentrated hydrochloric acid. 200γ on Whatman Paper No. 1, staining with ninhydrin and Pauly reagent: $R_f(40)=0.40$; $R_f(40)=0.36$.

(8) *L-valyl-$N^\epsilon$-tertiary-butyloxycarbonyl-L-lysyl-L-valyl-L-tyrosyl-L-proline-tertiary butyl ester*

47.98 g. of carbobenzoxy-L-valyl-$N^\epsilon$-tertiarybutyloxycarbonyl-L-lysyl-L-valyl-L-tyrosyl-L-proline-tertiary butyl ester (melting at 161–163° C.) are suspended in 320 ml. of methanol, 3.2 g. of palladium carbon of 10% strength are added, and the whole is hydrogenated in a duck-shaped shaking vessel while absorbing the carbon dioxide. The absorption of hydrogen is accompanied by dissolution of the suspended pentapeptide and is complete in about 3 hours. After another 1–2 hours the catalyst is filtered off through a G4-frit, rinsed with methanol, and the filtrate is evaporated to dryness. The powdered material is dried under a high vacuum at 45° C. until its weight remains constant. Yield: 40.27 g. (=98.7% of the theoretical) of amorphous L-valyl-$N^\epsilon$-tertiary butyloxycarbonyl-L-lysyl-L-valyl-L-tyrosyl-L-proline tertiary butyl ester melting unsharply at about 130° C. $[\alpha]_D = -69.2°$ C. ± 0.6° C. (c.=2 in methanol). Paper chromatography: 200γ on Whatman Paper No. 1, staining with ninhydrin and Pauly reagent: $R_f(40)=0.92$; $R_f(45)=0.94$.

(9) *Carbobenzoxy-L-arginyl-L-proline methyl ester hydrochloride*

154 g. (=0.5 mol) of carbobenzoxy-L-arginine and 83 g. (=0.5 mol) of L-proline methyl ester hydrochloride are suspended in 2.5 liters of chloroform, and 112 g. (=0.55 mol) of dicyclohexylcarbodiimide are vigorously stirred in. The reaction mixture is stirred for 5 hours at 50° C., then cooled to 20° C. and 5 ml. of glacial acetic acid are stirred in, then further stirred for 2 hours at 0 to 5° C.; the crystalline mixture of dicyclohexylurea and reaction product is suctioned off, washed with chloroform and dried under vacuum at 40° C. The mixture is stirred with 2 liters of water for 30 minutes at 40° C., and the undissolved dicyclohexylurea is filtered off. The aqueous filtrate is concentrated to syrup consistency under vacuum at a bath temperature of 40 to 50° C. and then mixed with 150 ml. of ethanol. After 2 hours, the precipitated crystalline product is filtered off and washed with ethanol. Yield: 192 g. (=84% of the theoretical) of carbobenzoxy-L-arginyl-L-proline methyl ester hydrochloride melting at 164–165° C. On concentration of mother liquor there are obtained another 5 g. of product melting at 163–165° C., totalling 197 g. (=86% of the theoretical). After recrystallization from 1.5 liters of absolute ethanol, the product melts at 165–167° C. $[\alpha]_D^{25} = -71.9°$ C. (c.=1.8 in water), —64.4° C. (c.=1.9 in methanol) and —67.1° C. (c.=2 in methanol+water 1:1). The product is paper-chromatographically unitary. $R_f$-values in the systems 43=0.79; 49=0.90; 54=0.86; 87=0.82. Staining with Sakaguchi reagent.

(10) L-arginyl-L-proline methyl ester dihydrochloride 45.6 g. (=0.1 mol) of carbobenzoxy-L-arginyl-L-proline methyl ester hydrochloride are dissolved with heating in 400 ml. of methanol, cooled to room temperature and then mixed with a methanolic solution containing 0.15 mol of hydrogen chloride. 2.0 g. of palladium carbon of 10% strength are added, and the whole is hydrogenated at room temperature under atmospheric pressure; 2180 ml. of hydrogen are absorbed within 30 minutes. The solution is filtered off the catalyst, evaporated under vacuum at a temperature not exceeding 35° C., and the residue is dried over potassium hydroxide under 0.1 mm. Hg pressure. The resulting oil is triturated with 150 ml. of ethyl ester to yield 35 g. (=98% of theory) of a colorless, amorphous powder, the L-arginyl-L-proline methyl ester dihydrochloride. The substance proves unitary in the paper chromatographic examination; $R_f$ values (49)=0.57; (54)=0.37; (56)=0.42; (87)=0.36 (staining with Sakaguchi reagent).

(11) Carbobenzoxy-L-arginyl-L-arginyl-L-proline methyl ester dihydrochloride A suspension of 30.8 g. (=0.1 mol) of carbobenzoxy-L-arganine and 55.8 g. (=0.1 mol) of L-arginyl-L-proline methyl ester dihydrochloride in 100 ml. of dimethylformamide is stirred for 30 minutes at room temperature until an almost complete solution has been obtained. 100 ml. of chloroform are added, and the solution is cooled to −5° C. and mixed with 22.7 g. (=0.11 mol) of dicyclohexylcarbodiimide. Within about 30 minutes at −5° C. another 300 ml. of chloroform are stirred in dropwise and the reaction mixture, from which dicyclohexyl urea gradually settles out, is stirred overnight at 0° C. 2 ml. of glacial acetic acid are added and the mixture is stirred for another hour at 0° C.; the precipitated dicyclohexylurea is filtered off and rinsed with dimethylformamide+chloroform 1:4. The filtrate is concentrated under vacuum at 40° C. to syrup consistency, and the residue is taken up in 300 ml. of water. The insoluble dicyclohexylurea is filtered off and the filtrate is extracted with 2× 100 ml. of chloroform. The aqueous solution is completely evaporated under vacuum and the residue is dried under a high vacuum at 40° C., to form a tough, hygroscopic foam. Yield: 78 g. (calculated 64.8 g.); the product contains water which cannot be removed by continued drying.

For purification 90 g. of crude product are dissolved in 200 ml. of methanol and precipitated, while being stirred, with 1 liter of ethyl acetate. The precipitated oily product solidifies when it is repeatedly stirred with ethyl acetate and forms an amorphous powder. Yield: after drying at 40° C. under 0.1 mm. Hg pressure: 86 g. Melting point 90–120° C. The recrystallized product contains about 3% of L-arginyl-L-proline and about 3% of carbobenzoxy-L-arginine, but it is sufficiently pure for the following reaction.

(12) Carbobenzoxy-L-arginyl-L-arginyl-L-proline hydrochloride 32.4 g. (=about 50 millimols) of crude carbobenzoxy-L-arginyl-L-arginyl-L-proline methyl ester dihydrochloride are dissolved with stirring in 100 ml. of N-sodium hydroxide solution, and stirring is continued for 20 minutes at 20° C. 52 ml. of 2 N-hydrochloric acid are then vigorously stirred in, and the reaction solution is evaporated under a vacuum at 30° C. The viscid residue is dried under 0.1 mm. Hg pressure at 30° C. until its weight remains constant, when it forms a brittle, colorless foam. Yield: 34 g. of mixture containing about 70% of carbobenzoxy - L-arginyl-L-arginyl-L-proline dihydrochloride, accompanied by sodium chloride and other impurities.

For conversion into the carbobenzoxy-tripeptide monohydrochloride 34 g. of the dihydrochloride are taken up in 150 ml. of dimethylformamide, the insoluble sodium chloride is filtered off, and 10.1 g. of triethylamine are stirred in at room temperature. The precipitated triethylamine hydrochloride is filtered off, and the clear filtrate is seeded with the monohydrochloride of the carbobenzoxytripeptide. The monohydrochloride slowly crystallizes in a finely granular form. The batch it kept for 20 to 24 hours at room temperature; the crystallizate is then suctioned off and washed with dimethylformamide and ethyl acetate. On drying at 50° C. under vacuum there are obtained 19 g. (=66% of theory) of carbobenzoxy - L-arginyl-L-arginyl-L-proline monohydrochloride melting at 248–249° C. Yield after recrystallization by solution in 100 ml. of methanol containing 1 equivalent of hydrogen chloride and addition of 2 equivalents of triethylamine: 16.7 g., melting at 259–262° C. $[\alpha]_D^{25}=-64.8°$ C.±1° C. (c.=1.4 in water). Sparingly soluble in all organic solvents, readily soluble in water. The substance is shown to be unitary in paper chromatography (200γ of an aqueous solution of 5% strength): $R_f$ (49)=0.68; (56)=0.63; (87)=0.62; staining with Sakaguchi reagent.

(13) Carbobenzoxy-L-arginyl - L - arginyl - L - prolyl-L-valyl-tertiary butyloxycarbonyl - L - lysyl-L-valyl-L-tyrosyl-L-proline-tertiary butyl ester-sulfate 9 g. (=15 millimols) of carbobenzoxy-L-arginyl-L-arginyl-L-proline hydrochloride are suspended in 75 ml. of dimethylformamide and dissolved by stirring in 7.5 ml. of a 2 N-solution of hydrogen chloride in ethyl acetate (conversion into the dihydrochloride). The whole is cooled to −10° C., and 1.8 g. (=15 millimols) of freshly distilled pivaloyl chloride and then 1.5 g. (=15 millimols) of triethylamine are stirred in; after 10 minutes the solution of the mixed anhydride is mixed with a solution of 9.5 g. (=12.5 millimols) of L-valyl-N$^\epsilon$-tertiary butyloxycarbonyl-L-lysyl-L-valyl-L-tyrosyl-L-proline tertiary butyl ester in 20 ml. of dimethylformamide. The batch is stirred for 10 minutes longer at −10° C., 100 ml. of water are added, and 75 ml. of 2 N-sodium sulfate solution are then dropped in. The precipitated crystalline sulfate of the octapeptide derivative is filtered off after 15 minutes, washed with water and dried under vacuum at 40° C. Yield: 13.7 g. (=78% of the theoretical) of a colorless powder which melts unsharply at about 220° C. The crude product is dissolved in 75 ml. of methanol of 80% strength and precipitated by adding 250 ml. of water. Yield: 11.8 g. Thin-layer chromatogram on silica gel: $R_f$ (100)=0.30; (102)=0.42. The substance contains traces of a more slowly travelling compound, but it is sufficiently pure for the further reaction.

(14) L-arginyl-L-arginyl - L - prolyl - L - valyl-tertiary-butyloxy-carbonyl - L - lysyl - L - valyl - L - tyrosyl-L-proline-tertiary-butyl ester triacetate A suspension of 14 g. (=10 millimols) of carbobenzoxy-L-arginyl-L-arginyl - L - prolyl-L-valyl-tertiary-butyloxy-carbonyl-L-lysyl - L - valyl-L-tyrosyl-L-proline-tertiary butyl ester-sulfate in 200 ml. of methanol of 80% strength is hydrogenated in the presence of 2 g. of palladium carbon of 10% strength at room temperature under atmospheric pressure. When the calculated amount of hydrogen has been absorbed, the hydrogenation comes to a standstill. The catalyst is filtered off and the solution is freed from sulfate ions by being filtered through a column of 200 ml. of Amberlite IRA–400 (acetate form) and rinsed with methanol of 80% strength. The eluate is evaporated under vacuum and the residue is powdered. The yield of L-arginyl-L-arginyl-L-prolyl-L-valyl-tertiary-butyloxycarbonyl-L-lysyl-L-valyl-L-tryosyl - L - proline-tetrtiary-butylester-triacetate is substantially quantitative.

In the thin-layer chromatogram of $R_f$-values are on silica gel (54) 0.40; (101) 0.60; on alumina (102) 0.22. Staining with Sakaguchi and Reindel-Hopps reagents.

(15) Carbobenzoxy-$N^\epsilon$-tertiary butyloxycarbonyl-L-lysyl-L-prolyl-L-valyl-glycine A solution of 40.85 g. (=61.7 millimols) of carbobenzoxy-$N^\epsilon$-tertiary butyloxycarbonyl-L-lysyl-L-prolyl-L-valyl-glycine ethyl ester (R. Schwyzer and W. Rittel, Helvetica Chimica Acta 44, page 159 [1961]) in 800 ml. of ethanol is cooled to 5° C. and 80 ml. of N-sodium hydroxide solution are added. After 3 hours at 5° C. 1 liter of water is added, the excess sodium hydoxide solution is neutralized with solid carbon dioxide and the ethanol is distilled off under vacuum, whereupon the sodium salt of the tetrapeptide derivative settles out in the residual aqueous phase as a gelatinous precipitate; it is dissolved by heating to 45° C.; a small amount of undissolved material is filtered off, the solution is cooled to 5° C. and 80 ml. of cold N-hydrochloric acid are added, whereupon carbobenzoxy-$N^\epsilon$—tertiary butyloxycarbonyl-L-lysyl-L-prolyl-L-valyl-glycine separates out in the form of a fine, powdery precipitate which is filtered off, washed with ice water until it is free from chloride, and then dried under vacuum over sulfuric acid. Yield: 34.19 g. (=88% of the theoretical). Melting point about 71 to 95° C. The product is sufficiently pure for further reactions.

(16) Carbobenzoxy - $N^\epsilon$ - tertiary-butyloxycarbonyl-L-lysyl - L - prolyl - L - valyl-glyoyl-tertiary-butyloxycarbonyl-L-lysyl-tertiary butyloxycarbonyl - L - lysine-methyl ester A solution of 23.3 g. (=36.8 millimols) of carbobenzoxy-$N^\epsilon$-tertiary butyloxy-carbonyl - L - lysyl-L-prolyl-L-valyl-glycine in 200 ml. of absolute tetrahydrofuran and 5.65 ml. (=1.1 equivalent) of absolute triethylamine is cooled to −15° C., and 3.63 ml. of chloroformic acid ethyl ester (=1.03 equivalent) are stirred in dropwise. The batch is stirred for 20 minutes at −15° C. and a solution of 17.5 g. (=35.9 millimols) of $N^\epsilon$-tertiary buytloxy-carbonyl-L-lysyl - $N^\epsilon$ - tertiary butyloxycarbonyl-L-lysine methyl ester (prepared according to U.S. patent application Ser. No. 46,893, filed Aug. 2, 1960, and now U.S. Patent 3,264,279) in 80 ml. of absolute tetrahydrofuran is added dropwise. The reaction mixture is left to itself for 24 hours at room temperature. The precipitated (mixture of triethylamine hydrochloride and hexapeptide derivative) is then suctioned off and washed with tetrahydrofuran and a large amount of ethyl acetate, whereupon the hexapeptide derivative once more passes into solution. The tetrahydrofuran solution and ethyl acetate solution are combined, evaporated to dryness, and the residue is distributed between water and a large amount of ethyl acetate. The ethyl acetate solution is washed with dilute citric acid solution, water, then with sodium bicarbonate solution and finally with water while being cooled with ice, then dried with sodium sulfate and evaporated. The evaporation residue is triturated with 2× 500 ml. of ether and 3× 1 liter of a mixture of tetrahydrofuran+ether 1:4, to furnish the hexapeptide derivative as an insoluble gelatinous powder in a yield of 31.3 g. For purification the crude product is dissolved with heating in 300 ml. of acetonitrile, and the solution is allowed to cool slowly in a water bath maintained at 60° C. (in Dewar vessel). The hexapeptide derivative crystallizes in the course of several days in fine needles, and in addition a small amount of gelatinous matter settles out. The precipitate is therefore heated several times to about 50 to 60° C., with the crystals remaining undissolved while the gelatinous matter dissolves. Finally, there is obtained in this manner the hexapeptide derivative in a completely crystalline form melting at 121–126° C. Yield: 30.12 g. (=76% of the theoretical). For analytical purposes the product is recrystallized from methanol and acetonitrile: M.P. 121–126° C. [α]$_D$=50.8° C. (c.=1.89 in methanol).

In the thin-layer chromatogram on silica gel plates the protected hexapeptide derivative displays only one spot, $R_f$=0.03 in ethyl acetate; $R_f$=0.23 in chloroform+methanol 19:1; $R_f$=0.65 in chloroform+methanol 9:1. (The plates are developed with Reindel-Hoppe reagent.)

(17) Carbobenzoxy - $N^\epsilon$ - tertiary-butyloxycarbonyl-L-lysyl - L - prolyl - L - valyl-glycyl-tertiary-butyloxycarbonyl - L - lysyl-tertiary butyloxycarbonyl-L-lysinehydrozide A solution of 20.00 g. (=18.10 millimols) of carbobenzoxy-$N^\epsilon$-tertiary-butyloxycarbonyl - L - lysyl-L-prolyl-L-valyl - glycyl - tertiary - butyloxycarbonyl - L - lysyl-tertiary-butyloxycarbonyl-L-lysine-methyl ester in 200 ml. of methanol is cooled to 0° C. and 10 ml. of hydrazine hydrate are added. The clear solution is kept for 3 days at 2° C., then concentrated to a small volume and a large amount of water is added. The resulting precipitate is thoroughly triturated, suction-filtered and washed copiously with ice water. While still moist, the product is once more dissolved in a small amount of methanol and again precipitated with water. Yield after having been suctioned off and dried under vacuum at 40° C.: 18.82 g. (=94% of the theoretical) of crude hexapeptide hydrazide melting at 141–145° C.

After recrystallization from 500 ml. of tertiary butanol+water (2:3), 37.0 g. of crude product furnish 34.30 g. of crystalline hydrazide melting at 156–158° C. [α]$_D^{25}$=−51.9° C.±0.5° C. (c.=1.91 in methanol).

Thin-layer chromatography on silica gel plates (60γ of the hydrazide applied and developed with Reindel-Hoppe reagent) reveals the following $R_f$-values: 0.0 (benzene+ethyl acetate 1:1); 0.26 (chloroform+methanol 9:1); 0.73 (dioxane+water 9:1).

(18) Carbobenzoxy - $N^\epsilon$ - tertiary-butyloxycarbonyl-L-lysyl - L - prolyl - L - valyl-glycyl-tertiary-butyloxycarbonyl - L - lysyl-tertiary-butyloxycarbonyl - L - lysyl-L-arginyl-L-arginyl - L - prolyl-L-valyl-tertiary-butyloxycarbonyl-L-lysyl - L - valyl-L-tyrosyl-L-proline-tertiary-butyl ester A solution of 6.26 g. (=5.66 millimols) of carbobenzoxy-$N^\epsilon$-tertiary-butyloxycarbonyl-L-lysyl - L - prolyl-L-valyl-glycyl-tertiary-butyloxycarbonyl - L - lysyl-tertiary-butyloxycarbonyl-L-lysine-hydrazide in 50 ml. of dimethylformamide is cooled to −20° C., and 15 ml. of N-hydrochloric acid are stirred in dropwise at a rate such that the temperature does not rise above −15° C. In the same manner 5.7 ml. of N-sodium nitrite solution are then dropped in, and the solution is stirred for 20 minutes at −7° C. A solution of 6.12 g. (=4.53 millimols) of L-arginyl-L-arginyl - L - prolyl - L - valyl-tertiary butyloxycarbonyl-L-lysyl - L - valyl - L - tyrosyl-L-proline tertiary butyl ester triacetate and 3.1 ml. of triethylamine in 60 ml. of dimethylformamide is then dropped in at −7° C., and the reaction mixture is left to itself for 65 hours at −2° C. The solvent is then distilled off under a pressure of 0.1 mm. Hg at a bath temperature of 40° C., and the residue is repeatedly washed with ether while being triturated. Yield: 10.7 g. of crude product which reveals in the thin-layer chromatogram on silica the tetradecapeptide derivative as the main spot with $R_f$=0.53 in system 100, and 0.25 in system 53 (staining with Sakaguchi and Reindel-Hoppe reagents) and in addition unreacted octapeptide derivative as well as several by-products stemming from the hexapeptide component.

To separate the chlorine ions the crude product is dissolved in 200 ml. of 0.5 N-acetic acid in methanol of 50% strength, filtered through a column of 50 ml. of Merck ion exchange resin II (weakly basic; acetate form) and rinsed with 200 ml. of the identical solvent. The product present in the eluate is further reacted as it is.

(19) $N^\epsilon$ - tertiary - butyloxycarbonyl - L - lysyl - L prolyl-L - valyl - glycyl - tertiary - butyloxycarbonyl - L - lysyl-tertiary - butyloxcarbonyl - L - lysyl - L - arginyl - L-arginyl-L-prolyl - L - valyl - tertiary - butyloxycarbonyl-L - lysyl - L - valyl - L tyrosyl - L - proline - tertiary butyl ester-tritosylate A solution of the protected tetradecapeptide ester is mixed with ml. of glacial acetic acid and hydrogenated in the presence of 1 g. of palladium carbon of 10% strength. After 17 hours, 157 ml. of hydrogen have been absorbed and the hydrogenation comes to a standstill. The catalyst is then filtered off and the filtrate is evaporated. The residue is washed with petroleum ether and dried for 18 hours at 40° C. under 0.01 mm. Hg pressure. Yield: 7.5 g. of crude product, which is dissolved in 50 ml. of tertiary butanol+water 1:1, poured over a column of 60 g. of carboxymethyl celluluose (suspended in the identical solvent mixture) and chromatographed with the use of a Uvicord and a linear gradient between 1 liter of tertiary butanol of 50% strength and 1 liter of teritiary butanol of 50% strength containing 10% of acetic acid. After 560 ml. of solvent have percolated, the elution of the tetradecapeptide derivative sets in; the peptide is collected in several fractions which are separately evaporated, to yield 4.1 g. of pure $N^\epsilon$ - tertiary - butyloxycarbonyl-L-lysyl-L-prolyl - L - valyl - glycyl - tertiary - butyloxycarbonyl - L-lysyl - tertiary - butloxycarbonyl - L - lysyl - L - arginyl-L - arginyl - L -prolyl - L - valyl - tertiary - butyloxycarbonyl - L - lysyl - L - valyl - L - tyrosyl - L proline-tertiary-butyl-ester triacetate. Another 2.8 g. of less pure substance are dissolvel in 10 ml. of water and chromatographed on 16 g. of carboxymethyl cellulose, with the use of a linear gradient between 500 ml. of water and 500 ml. of acetic acid of 10% strength, to yield another 2.15 g. of pure substance. Total yield: 6.25 g. (=60% of the theoretical yield, calculated from the originally used octapeptide).

In the thin-layer chromatogram on silica gel the following $R_f$-values are found: 0.23 in system 100; 0.25 in system 52.

The resulting triacetate of the tetradecapeptide derivative is converted into the tritosylate in the following manner:

A solution of 6.25 g. (=2.73 millimols) of the product in 100 ml. of dry pyridine is mixed with 1.70 g. of para-toluenesulfonic acid, the solution is evaporated to dryness, the residue freed from the pyridine acetate by being dried for 18 hours at 35° C. under 0.01 mm. Hg pressure, and from the pyridine tosylate by being triturated with acetone and suction-filtered. Yield: 7.26 g. of colorless powder melting at 155–162° C.

EXAMPLE 19.—H-SER-TYR-SER - MET - GLU - HIS-PHE-ARG-TRY-GLY-LYS-PRO - VAL - GLY - LYS-LYS-ARG-ARG-PRO-VAL-LYS-VAL-TYR-PRO - OH $CH_3 \cdot COOH$ 100 mg. of crude, protected tetradecosapeptide (Example 17; still contaminated with starting peptides) are treated for 1 hour at room temperature with 2 cc. of anhydrous trifluoro-acetic acid. The excess acid is evaporated in vacuum at room temperature and the resulting residue is triturated with much absolute ether. The amorphous scission product is subjected to continuous high voltage electrophoresis (700 volts; 30 milliamperes) in 4.5 cc. of 0.5 N-acetic acid. Rate of application: 1 cc. per hour. In all, 23 fractions are collected. The fractions 1–9, 10, 12–13, 14–15, 16 and 17–23 are evaporated. As revealed by electrophoretic analysis, the bulk of the desired tetracosapeptide is contained in fractions 12–15. For purification the combined fractions 12–15 are dissolved in 2 cc. of 0.01-molar ammonium acetate buffer and poured over a column of carboxymethylcellulose (diameter: 1 cm.; height: 1.16 cm.; 2.5 grams). The carboxymethylcellulose is introduced into the column with 100 cc. of 0.01-molar ammonium acetate buffer and then eluted with another 50 cc. of the same buffer. The peptide is then eluted from the column with ammonium acetate buffer (pH=5.4) of increasing molarity (0.1-m. to 0.7-m.).

Fractions of 10 cc. volume each are collected in an automatic fraction collector. After 15 fractions, the peptide has been quantitatively removed from the column. A total of 15 fractions is obtained. The vessels 10 to 13 contain electrophoretically pure tetracosapeptide. The path covered after 1 hour at 3000 volts and pH=1.9 is 13 to 17 cm.

In the in-vitro test according to Saffran and Schally the peptide obtained reveals a considerable adrenocorticotropic activity.

EXAMPLE 20

(1) Carbobenzoxy-L-arginyl-L-tryptophyl-glycine methyl ester hydrochloride 40 g. (=0.128 mol) of L-tryptophyl-glycine methyl ester hydrochloride and 41.5 g. (=0.135 mol) of carbobenzoxy-L-arginine are stirred in 650 ml. of absolute pyridine at 40° C. until a weakly turbid solution has formed; it is cooled to room temperature and 39.6 g. of dicyclohexylcarbodiimide (0=0.192 mol) are added. The batch is stirred for 1 hour and then kept overnight at room temperature. The following day the mixture is cooled to 0° C. and the dicyclohexylurea is suctioned off. The filtrate is considerably concentrated under vacuum, the thick oil is dissolved in chloroform and the solution is stirred dropwise into a large amount of ether, whereupon an amorphous precipitate forms. The ether is decanted and the residue is copiously washed with ether. After drying under vacuum at 50° C., there are obtained 77.3 g. of a faintly reddish brown powder (100% theoretical yield=77.1 g.). The resulting product is used for the next stage without first having been purified.

(2) L-Arginyl-L-tryptophyl-glycine methyl ester

A solution of 77.2 g. (=0.128 mol) of carbobenzoxy-L-arginyl-L-tryptophyl-glycine methyl ester hydrochloride in 800 ml. of N-acetic acid is stirred with 5 g. of Norite. After about 10 minutes the mixture gelatinizes. On addition of 40 ml. of glacial acetic acid and heating to 40° C. the substance passes again into solution and the active carbon is suctioned off through Celite. 5 g. of palladium carbon (10% strength) are added to the filtrate which is then hydrogenated until after about 6 hours the theoretical amount of hydrogen has been absorbed (2.9 litres). The catalyst is filtered off and the filtrate is mixed with Amberlite IRA–400 (acetate form) and stirred until chloride ions can no longer be detected. The ion exchange resin is suctioned off, washed with water, and the filtrate is evaporated to dryness under vacuum, to yield 74.5 g. L-arginyl-L-tryptophyl-glycine methyl ester diacetate in the form of a yellowish foam.

Conversion into the ditosylate.—34.5 g. (=0.625 mol) of L-arginyl-L-tryptophyl-glycine methyl ester diacetate are dissolved in 200 ml. of methanol and mixed with 23.8 g. of para-toluenesulfonic acid, $1H_2O$ (0.125 mol). The solution is evaporated to dryness under vacuum, and the residue is completely dehydrated with ethanol and dried under vacuum. The ditosylate is obtained in the form of a beige foam (48 g.).

(3) Carbobenzoxy-L-phenylalanyl-L-arginyl-L-tryptophyl-glycine methyl ester acetate 45 g. (=58 millimols) of L-arginyl-L-tryptophyl-glycine methyl ester ditosylate, 26 g. (=87 millimols) of carbobenzoxy-L-phenylalanine and 8.1 g. (=58 millimols) of triethylamine are dissolved at room temperature in 450 ml. of acetonitrile. 19.3 g. (=94 millimols) of dicyclohexylcarbodiimide are then added and the whole is stirred for 1½ hours at room temperature, then kept overnight in an icebox and the dicyclohexylurea is suctioned off. The filtrate is considerably concentrated under vacuum, and the product is precipitated with ether in the form of a viscid substance.

The solvent is decanted and the residue dried at 50° C. under vacuum. For purification, the crude product (65 g.) is transformed into the acetate: The crude product is dissolved at 50° C. in 250 ml. of tertiary butanol and the batch is mixed with 200 ml. of water. The faintly turbid solution is filtered through a column of an ion exchange resin (Amberlite IRA–400, acetate form, previously washed with 50% tertiary butanol), then rinsed with tertiary butanol of 50% strength until spot tests with Sakaguchi reagent give a negative result. The filtrate is evaporated to dryness under vacuum at 50° C. to obtain as residue 49.2 g. of carbobenzoxy-L-phenylalanyl-L-arginyl-L-tryptophyl-glycine methyl ester acetate as a light-brown foam. The $R_f$-value in the system 52 is 0.83, and in the thin-layer chromatogram in system 101=0.7. The product is hydrogenated as it is, without first having been purified.

(4) L-Phenylalanyl-L-arginyl-L-tryptophyl-glycine methyl ester

A solution of 49 g. (=63.4 millimols) of carbobenzoxy - L - phenylalanyl - L - arginyl - L - tryptophyl - glycine methyl ester acetate in 600 ml. of methanol of 90% strength is mixed with 4.9 g. of palladium carbon of 10% strength and hydrogenated, while absorbing the carbon dioxide released with potassium hydroxide. After 75 minutes 1130 ml. of hydrogen have been absorbed and the hydrogenation comes to a standstill. The catalyst is filtered off and the filtrate is evaporated to dryness under vacuum. The residue (39 g.=96% of the theoretical yield) reveals in the paper chromatogram the following $R_f$-values in system 52=0.45; 54=0.65; 56=0.78; 87=0.5. In the paper-electro-phoresis in N-acetic acid, 7 v./cm., 5 hours, the distance travelled is 18 cm.

(5) Carbobenzoxy-($\gamma$-tertiary butyl)-L-glutamyl-$N^{im}$-trityl-L-histidine methyl ester A solution of 18.8 g. (=38.7 millimols) of carbobenzoxy-($\gamma$-tertiary butyl)-L-glutamyl-L-histidine methyl ester in 160 ml. of absolute chloroform is mixed with 7.74 ml. (=55.7 millimols) of N-triethylamine and 10.84 g. (=39 millimols) of triphenylchloromethane are then added portionwise. The reaction mixture is stirred for 3 hours at room temperature and then kept for 24 hours at room temperature. The chloroform solution is then washed with 3× 60 ml. of water, 3× 40 ml. of ice-cold citric acid solution of 5% strength and finally with water until the washings run neutral. The aqueous phases are further extracted in a second separating funnel with fresh chloroform. The combined organic phases are dried over magnesium sulfate, filtered and evaporated to dryness under vacuum. Yield: 28.1 g. (=99% of theory) of carbobenzoxy-($\gamma$-tertiary butyl)-L-glutamyl-$N^{im}$-trityl-L-histidine methyl ester. $R_f$ (in benzene+acetone 1:1)=0.7. In the thin-layer chromatogram on silica gel in the system benzene+acetone (1:1) the compound produces with Reindel-Hoppe reagent only one positive spot.

(6) Carbobenzoxy-($\gamma$-tertiary butyl)-L-glutamyl-$N^{im}$-trityl-L-histidine hydrazide A mixture of 3.7 g. (=5.1 millimols) of carbobenzoxy-$N^{im}$-trityl-dipeptide ester in 10 ml. of methanol and 0.6 ml. of hydrazine hydrate is kept for 48 hours at 0° C. The methanol is then evaporated under vacuum at room temperature to a small volume and the hydrazide is precipitated with a large amount of petroleum ether. The initially smeary precipitate solidifies on standing at 0° C. The petroleum ether is decanted and the partially gelatinous residue is repeatedly triturated with cold petroleum ether. The residue is freed from the solvent and dried in a desiccator over sulfuric acid under a high vacuum. Yield: 3.7 g. (=100% of the theoretical) of amorphous carbobenzoxy dipeptide hydrazide. Thin-layer chromatogram on silica gel: $R_f$=0.25 in the system benzene+acetone 1:1.

The crude product is used as it is for the condensation yielding the hexapeptide derivative.

(7) Carbobenzoxy-($\gamma$-tertiary butyl)-L-glutamyl-$N^{im}$-trityl-L-histidyl-L-phenylalanyl-L-arginyl - L - tryptophyl-L-glycine methyl ester acetate 3.64 g. (=5 millimols) of carbobenzoxy-($\gamma$-tertiary butyl)-L-glutamyl-$N^{im}$-trityl-L-histidine hydrazide in 16 ml. of freshly distilled dimethylformamide are mixed at −10° C. with 7.5 ml. of ice-cold 2 N-hydrochloric acid, with the temperature rising to −5 to 0° C. The batch is once more cooled to −10° C. and 55 ml. of previously cooled N-sodium nitrite solution are vigorously stirred in dropwise, with the azide settling out as a cheesy precipitate. On addition of further 16 ml. of cold dimethylformamide the precipitated azide dissolves once more. At the same time a solution is prepared of 3.14 g. (=4.5 millimols) of L-phenylalanyl-L-arginyl-L-tryptophyl-glycine methyl ester diacetate in 20 ml. of dimethylformamide, and 2.12 ml. of N-triethylamine are added. This solution is likewise cooled to −10° C. and vigorously stirred into the azide solution. The reaction is maintained for 1 hour at −10° C. and then for 20 hours at 0° C. The precipitated salt is then filtered off, the reaction solution is diluted with 700 ml. of ethyl acetate and the organic phase is copiously washed with water and dried over sodium sulfate; the whole is evaporated to a small volume and the crude, protected hexapeptide derivative is precipitated with a large amount of ether. The crude product is once more precipitated from methanol+ether, filtered off and dried at 40° C. under a high vacuum. Yield: 4.1 g. (=68% of the theoretical) of carbobenzoxy-($\gamma$-tertiary butyl)-L-glutamyl-$N^{im}$-trityl-L-histidyl - L - phenylalanyl-L-arginyl-L-tryptophyl-glycine methyl ester acetate.

In the thin-layer chromatogram on silica gel in the systems 52, 100 and 101 the substance produces only one spot each with Pauly, Ehrlich and Reindel-Hoppe reagents. $R_f$ (52)—0.6; $R_f$ (100)=0.72; $R_f$ (101)=0.8.

(8) Carbobenzoxy-($\gamma$-tertiary butyl)-L-glutamyl-$N^{im}$-trityl-L-histidyl-L-phenylalanyl-L-arginyl - L - tryptophyl-glycine 1.84 g. (=1.38 millimols) of carbobenzoxy-($\gamma$-tertiary butyl)-L-glutamyl-$N^{im}$-trityl-L-histidyl - L - phenylalanyl-L-arginyl-L-tryptophyl-glycine methyl ester acetate are hydrolyzed for 90 minutes in 80 ml. of dioxane of 75% strength of 3.4 ml. of N-sodium hydroxide solution at room temperature. The pH-value is adjusted with acetic acid to 5 and the solvent is evaporated under vacuum at 40° C. The amorphous carbobenzoxy hexapeptide is reprecipitated once from methanol+ether. Yield: 1.56 g. (=85.5% of the theoretical) of carbobenzoxy-($\gamma$-tertiary butyl)-L-glutamyl-$N^{im}$-trityl-L-histidyl - L - phenylalanyl-L-arginyl-L-tryptophyl-glycine.

A specimen of the product, crystallized from methanol of 70% strength, melts at 213–214° C. with decomposition. $[\alpha]_D^{25}=-22.5°\pm1°$ (c.=1 in methanol).

In the thin-layer chromatogram on silica gel the protected hexapeptide reveals the following values:

$R_f(101)=0.75$; $(52)=0.2$; $(100)=0.5$.

(9) ($\gamma$-Tertiary butyl)-L-glutamyl-$N^{im}$-trityl-L-histidyl-L-phenylalanyl-L-arginyl-L-tryptophyl-glycine 1.3 g. (=1 millimol) of carbobenzoxy($\gamma$-teritary butyl) - L - glutamyl-$N^{im}$-trityl-L-histidyl-L-phenylalanyl-L-arginyl-L-tryptophyl-glycine are hydrogenated in 150 ml. of methanol in the presence of 300 mg. of palladium black catalyst until a standstill is reached. To absorb the carbon dioxide a second vessel with potassium hydroxide is interpolated. The solution is freed from the catalyst and evaporated to dryness under vacuum. The evaporation residue is once more reprecipitated from methanol+ether, to yield 1.2 g. of amorphous (γ-tertiary butyl)-L-glutamyl - N$^{im}$ - trityl-L-histidyl-L-phenylalanyl-L-arginyl-L-tryptophyl-glycine.

In the thin-layer chromatogram on silica gel the compound reveals in system 101 an R$_f$ value of 0.65.

The hexapeptide lends itself to staining with Reindel-Hoppe reagent and ninhydrin, but with Pauly reagent it gives a very faint yellow tint.

A specimen of the hexapeptide is hydrolyzed with 7.1N-hydrochloric acid for 24 hours at 115° C., and the hydrolysate is treated with L-aminoacid oxidase in tris-buffer (pH=7–8) for 24 hours at 37° C.; no D-aminoacids could be detected.

The compound is transformed into the decapeptide as it is.

(10) *Tertiary butyloxycarbonyl-L-seryl-L-tyrosyl-L-seryl-L-methionyl-(γ-tertiary butyl)-L-glutamyl-N$^{im}$-trityl-L-histidyl-L-phenylalanyl-L-tryptophyl-glycine*

A mixture of 1 g. (=1.65 millimols) of tertiary butyloxycarbonyl - L-seryl-L-tyrosyl-L-seryl-L-methionine hydrazide and 10 ml. of dimethylformamide is cooled to −10° C., and at this temperature 4.5 ml. of N-hydrochloric acid are dropped in. After 2 to 3 minutes 1.8 ml. of N-sodium nitrite solution (which has been cooled to 0° C.) are slowly added, and the batch is allowed to react for 5 minutes at −7° C. The reaction solution is then mixed with 150 ml. of ice-cold saturated sodium sulfate solution. After about 5 minutes 6 ml. of cold N-sodium bicarbonate solution are added, whereupon crystalline BOC-tetrapeptide azide slowly settles out. The precipitation takes 20 to 30 minutes; the azide is filtered off at 0° C., and washed with ice-water and finally with ice-cold ether. While still moist, the azide is immediately vigorously stirred into a solution, prepared at the same time and cooled to −10° C., of 1.12 g. (=1 millimol) of (γ-tertiary butyl)-L-glutamyl-N$^{im}$-trityl-L-histidyl-L-phenylalanyl-L-arginyl-L-tryptophyl-glycine in a mixture of 30 ml. of dimethylformamide, 0.2 ml. of triethylamine and 4 g. of magnesium sulfate. The batch is allowed to react for 24 hours at 0° C., the magnesium sulfate is removed by centrifugation and the inorganic salt is rinsed with 3× 10 ml. of dimethyl-formamide. 2 ml. of acetic acid of 10% strength are then added to the dimethyl-formamide solution and the whole is evaporated under vacuum to a small volume. The crude product, tertiary butyloxycarbonyl decapeptide derivative, which is still contaminated with starting material, is then precipitated from its solution with a large amount of ethyl acetate. Crude yield: 1.55 g. of tertiary butyloxycarbonyl-L-seryl-L - tyrosyl - L-seryl-L-methionyl-(γ-tertiary butyl)-L-glutamyl - N$^{im}$ - trityl-histidyl-L-phenylalanyl-L-tryptophyl-glycine.

The thin-layer chromatogram on silica gel reveals in the systems 52 and 100, in addition to a small main spot which travels slowly, the tertiary butyloxycarbonyl decapeptide of R$_f$ 0.65 (in system 52) and 0.25 (in system 100).

On crystallization from methanol of 90% strength the substance melts at 182–185° C.

(11) *N$^ε$ - tertiary - butyloxycarbonyl-L-lysyl-L-proplyl-L-valyl - glycyl - tertiary - butyloxycarbonyl - L - lysyl-tertiary-butyloxycarbonyl-L-lysyl-L-arginyl-L-arginyl-L-prolyl - L - valyl - tertiary-butyloxycarbonyl-L-lysyl-L-valyl-L-tyrosyl-L-proline-tertiary butyl ester-tritosylate*

5 g. (=3.8 millimols) of the triacetate of N$^ε$-tertiary-butyloxycarbonyl - L-lysyl-L-prolyl-L-valyl-glycyl-tertiary-butyloxycarbonyl - L - lysyl-tertiary-butyloxycarbonyl-L-lysyl - L-arginyl-L-arginyl-L-prolyl-L-valyl-tertiary-butyloxycarbonyl - L-lysyl-L-valyl-L-tyrosyl-L-proline-tertiary butyl ester (see U.S. patent application Ser. No. 191,443, filed May 1, 1962, and now U.S. Patent 3,228,926) in 7.5 ml. of absolute pyridine are mixed at 0° C. with a solution of 1.11 g. of anhydrous para-toluenesulfonic acid in 7.5 ml. of pyridine; the pyridine is then evaporated and the evaporation residue is triturated with absolute ether and absolute benzene. Yield: 5.7 g. (=100% of the theoretical) of N$^ε$-tertiary-butyloxycarbonyl-L-lysyl-L-prolyl-L-valyl - glycyl-tertiary-butoxycarbonyl-L-lysyl-tertiary-butyloxylcarbonyl - L - lysyl-L-arginyl-L-arginyl-L-prolyl-L-valyl - tertiary-butyloxycarbonyl-L-lysyl-L-valyl-L-tyrosyl-L-proline-tertiary butyl ester-tritosylate. The R$_f$ value of the tritosylate in the thin-layer chromatogram on silica gel is identical with that of the triacetate.

(12) *Tertiary - butyloxycarbonyl - L - seryl - L - tyrosyl-L - seryl - L - methionyl - γ - tertiary - butyl - L - glutamyl - N$^{im}$ - trityl - L - histidyl - L - phenylalanyl - L-arginyl - L - tryptophylglycyl - N$^ε$ - tertiary - butyloxycarbonyl - L - lysyl - L - prolyl - L - valyl - glycyl - tertiary - butyloxycarbonyl - L - lysyl - tertiary - butyloxycarbonyl - L - lysyl - L - arginyl - L - arginyl - L - prolyl-L- valyl - tertiary - butyloxycarbonyl - L - lysyl - L-valyl-L-tyrosyl-L-proline tertiary-butyl ester*

73 mg. (=43 millimols) of tertiary-butyloxycarbonyl-L - seryl - L - tyrosyl - L - seryl - L - methionyl - γ - (tertiary - butyl) - L - glutamyl - N$^{im}$ - trityl - L - histidyl-L-phenylalanyl-L-arginyl-triptophyl-glycine and 100 mg. (38 millimols) of N$^ε$-tertiary-butyloxycarbonyl-L-lysyl-L - prolyl - L - valyl - glycyl - tertiary - butyloxycarbonyl-L - lysyl - tertiary - butyloxycarbonyl - L - lysyl - L-arginyl - L - arginyl - L - prolyl - L - valyl - tertiary - butyloxycarbonyl - L - lysyl - L - valyl - L - tyrosyl - L-proline-tertiary-butyl ester-tritosylate are stirred for 45 minutes at room temperature in 1 ml. of pyridine. 33 mg. (=158 millimols) of dicyclohexylcarbodidimide are then added to the clear solution, and the batch is allowed to react for 30 hours at room temperature. The precipitated dicyclohexylurea is removed by centrifugation, and the crude reaction product is precipitated with a large amount of peroxide-free ether. Yield: 180 ml. of crude, protected tetracosapeptide derivative.

The thin-layer chromatogram on alumina contains a main spot (R$_f$ in system 100=0.7) in addition to traces of the parent peptides.

The tosylate is exchanged for the acetate on a column of Amberlite IR–4B, and 120 mg. of this acetate are chromatographed on carboxymethyl cellulose.

Elution with tertiary butanol of 50% strength, containing increasing amounts of acetic acid, yields 82.5 g. of pure, protected tetracosapeptide tertiary butyl ester triacetate.

Thin-layer chromatogram on alumina: R$_f$ (100)=0.6; (52)=0.9.

(13) *L - seryl - L - tyrosyl - L - seryl - L - methionyl - L-glutamyl - L - histidyl - L - phenylalanyl - L - arginyl-L - tryptophyl - glycyl - L - lysyl - L - prolyl - L - valyl-glycyl - L - lysyl - L - lysyl - L - arginyl - L - arginyl-L - prolyl - L - valyl - L - lysyl - L - valyl - L - tyrosyl-L-proline hexaacetate*

A mixture of 100 mg. of protected tetracosapeptide ester triacetate and 0.4 ml. of trifluoroacetic acid of 50% strength is left to itself for 60 to 120 minutes at room temperature. The trifluoroacetic acid is then evaporated under vacuum and the trifluoroacetate is exchanged for the acetate on ion exchange resin Merck III. Yield: 70 mg. of tetracosapeptide hexaacetate.

For purification the crude tetracosapeptide is chromatographed on a column of carboxymethyl cellulose. The bulk of the pure peptide can be eluted with 0.2–0.3 molar ammonium acetate buffer of pH=6.

EXAMPLE 21

(1) *Carbobenzoxy-(γ-tertiary butyl)-L-glutamic acid p-nitro-phenyl ester*

38.7 g. (0.11 mol) of carbobenzoxy-(γ-tertiary butyl)-L-glutamic acid and 19.1 g. (0.13 mol) of para-nitrophenol are dissolved in 12 ml. of ethyl acetate. The solution is cooled to −12° C., and in the course of 30 minutes a solution of 26 g. of dicyclohexylcarbodiimide in 55 ml. of ethyl acetate is added dropwise. The solution is stirred for 2 hours at −10° C. and then overnight at room temperature. The excess carbodiimide is destroyed with glacial acetic acid, the dicyclohexylurea is filtered off, the filtrate is evaporated to dryness and the residue dissolved in 200 ml. of chloroform. After the solution has been washed with potassium carbonate and water and dried with sodium sulfate, it is evaporated to dryness and the residue taken up in 200 ml. of methanol. The solution is diluted with water and cooled to −7° C., whereupon carbobenzoxy-(γ-tertiary butyl)-L-glutamic acid para-nitrophenyl ester precipitates in crystalline form. Yield: 50.8 g.=96.6% of the theoretical yield. Melting point: 51–53° C.; optical rotation $[\alpha]_D^{25} = -29.0 \pm 1°$ (c.=3 in ethanol).

(2) *Carbobenzoxy - (γ - tertiary butyl) - L - glutamyl-L-histidine methyl ester*

26.9 grams (0.058 mol) of carbobenzoxy-(γ-tertiary butyl)-L-glutamic acid para-nitrophenyl ester and 10.0 grams (0.06 mol) of L-histidine-methyl ester are dissolved in 250 ml. of chloroform at room temperature. The solution is stirred for 36 hours at room temperature, 250 ml. of chloroform are then added, the reaction solution is cooled to 0° C. and washed in succession with 2 N-hydrochloric acid, saturated sodium chloride solution, 2 N-potassium carbonate solution and saturated sodium chloride solution. The chloroform solution is dried over sodium sulfate and carbobenzoxy-(γ-tertiary butyl)-L-glutamyl-L-histidine-methyl ester precipitated by means of ethyl-butyl ether. The crystalline product (yield 24.95 g.=87.1% of the theoretical yield) melts at 113–115° C.; optical rotation $[\alpha]_D^{25} = -12.5°$ (c.=1.5 in methanol).

(3) *Carbobenzoxy-(γ-tertiary butyl)-L-glutamyl-L-histidine hydrazide*

2.44 g. (5 millimols) of carbobenzoxy - (γ - tertiary butyl)-L-glutamyl-L-histidine-methyl ester, dissolved in 20 ml. of absolute ethanol, are cooled to 0° C. and treated with 0.8 ml. of hydrazine hydrate. After the reaction mixture has been allowed to stand for 60 hours at the above temperature, the alcohol is evaporated to a small volume and the residue is treated with much ether. The carbobenzoxy-dipeptide hydrazide precipitates as a greasy product which solidifies after being allowed to stand for a long time at 0° C. and being frequently scratched with a glass rod.

The bulk of the hydrazide precipitates in the form of a gelatinous product which is allowed to stand for 10 hours at 0° C.; the gelatinous precipitate is filtered through a G–2 sintered glass plate, washed with much ether and petroleum ether and then finally dried at 40° C. in a high vacuum. Yield: 2.3 g. (94% of the theoretical yield). Melting point: 119–120° C.

The hydrazide is readily soluble in cold ethanol and methanol, but only sparingly soluble in ethyl acetate, even with heating. When repeatedly recrystallized from a mixture of methanol and water the analytically pure product melts at 140–142° C. (it sinters at 75° C.). Optical rotation: $[\alpha]_D^{26} = -37.8° \pm 0.5°$ (c.=2.333 in N-hydrochloric acid).

(4) *Carbobenzoxy-(γ-tertiary butyl)-L-glutamyl-L-histidyl - L - phenylalanyl - L - arginyl - L - tryptophyl-glycine methyl ester sulfate*

10.1 g. (20 millimols) of carbobenzoxy - (γ - tertiary butyl)-L-glutamyl-L-histidine hydrazide hydrate are suspended in 23 ml. of dimethylformamide and 100 ml. of sodium chloride solution of 18% strength. After stirring for 10 minutes at room temperature, the suspension is cooled to −15° C., and 40 ml. of 1.98 N-hydrochloric acid, previously cooled to −15° C., in a 10% sodium chloride solution are added dropwise with stirring and then 4.4 ml. of 5 N-sodium nitrite solution. 300 ml. of methylene chloride, previously cooled to −15° C., are then added with stirring. The pH value is then adjusted to 6.0 with the aid of cold sodium carbonate solution, the organic phase is separated and dried with magnesium sulfate. 18 ml. of dimethylformamide are added to the azide solution which is then freed from methylene chloride in vacuo; the solution is cooled to −15° C. and treated with a solution of 9.2 g. (15 millimols) of L-phenylalanyl-L-arginyl - L - tryptophyl - glycine - methyl ester hydrochloride in 45 ml. of dimethylformamide and 1.52 g. of triethylamine. After the reaction solution has been allowed to stand for 15 hours at 0° C., 1.8 litres of toluene are added and the whole stirred for 2 hours at −5° C. The crude carbobenzoxy-(γ-tertiary butyl)-L-glutamyl - L - histidyl - L - phenylalanyl - L - arginyl-L-tryptophyl-glycine-methyl ester (16.05 g.) precipitating in the form of a gel is separated and dissolved at 40° C. in 145 ml. of methanol, and filtered through Hyflo; to the clear filtrate 18.5 ml. of water are added dropwise and then, with stirring, 110 ml. of 2 N-sodium sulfate. The hexapeptide derivative precipitates as sulfate in the form of fine crystals. Yield: 13.6 g.=88% of the theoretical yield. Optical rotation: $[\alpha]_D^{25} = -32 \pm 1°$ (c.=1 in water-isopropanol, 1:3). The product is unitary in the thin layer chromatogram on silica gel in systems 52 and 100.

(5) *Carbobenzoxy-(γ-tertiary butyl) - L - glutamyl - $N^{im}$-trityl - L - histidyl -L - phenylalanyl - L - arginyl - L-tryptophyl-glycine-methyl ester sulfate*

10.8 g. of carbobenzoxy-(γ-tertiary butyl)-L-glutamyl-L-histidyl - L - phenylalanyl - L - arginyl - L - tryptophyl-glycine-methyl ester sulfate are dissolved in 70 ml. of dimethylformamide, cooled to 0° C. and treated with 3 ml. of triethylamine and 3.9 g. of triphenylchloromethane. After the reaction mixture has been allowed to stand for 24 hours at 0° C., the triethylammonium chloride which has crystallized out is filtered with suction and the filtrate precipitated with much ether. The flaky precipitate is filtered with suction. Yield: 12.66 g. of carbobenzoxy-(γ-tertiary butyl) - L - glutamyl - $N^{im}$-trityl-L-histidyl-L-phenylalanyl - L - arginyl - L - tryphtophyl - glycine-methyl ester sulfate=96% of the theoretical yield. The substance is unitary in the thin layer chromatogram. $R_f$ 52=0.6 (on silica gel).

The compound can be converted into the tetracosapeptide for instance by the methods described in Example 20 under (8) to (13).

EXAMPLE 22

(1) *(γ-Tertiary butyl)-L-glutamyl - L - histidyl-L-phenylalanyl-L-arginyl - L - tryptophyl - glycine - methyl ester sulfate*

10.84 g. of carbobenzoxy-(γ-tertiary butyl)-L-glutamyl-L-histidyl - L - phenylalanyl - L - arginyl - L -tryptophyl-glycine-methyl ester sulfate are dissolved in 500 ml. of acetic acid of 80% strength and hydrogenated in the presence of 1 g. of palladium black of 10% strength until the absorption of hydrogen ceases. The carbon dioxide formed is absorbed in a second vessel with potassium hydroxide solution. The catalyst is filtered with suction, the acetic acid evaporated to a small volume in vacuo and the residue precipitated with ether. Yield: 9.91 g. of (γ-tertiary butyl)-L-glutamyl - L - histidyl-L-phenylalanyl-L-arginyl - L - tryptophyl - glycine - methyl ester sulfate=98% of the theoretical yield.

$R_f$=0.10 in the thin layer chromatogram on silica gel in the system ethyl acetate - n - butanol - pyridine - glacial acetic acid-water (80:40:40:12:19). The compound does not contain any starting material ($R_f$=0.26).

(2) *Trityl-(γ-tertiary butyl)-L-glutamyl-N$^{im}$ - trityl - L-histidyl-L-phenylalanyl-L-arginyl - L - tryptophyl-glycine methyl ester sulfate*

The hexapeptide derivative obtained under (1) is dissolved in 100 ml. of dimethylformamide, treated with 6.1 ml. of triethylamine and 8 g. of triphenylchloromethane and allowed to stand for 24 hours at room temperature. The reaction solution is then cooled to 0° C., the triethylammonium chloride is filtered with suction, the filtrate concentrated and the product precipitated with ether. Yield: 13.2 g. of trityl-(γ-tertiary butyl)-L-glutamyl-N$^{im}$-trityl-L-histidyl-L - phenylalanyl-L-arginyl-L-tryptophyl-glycine-methyl ester sulfate=94% of the theoretical yield. The thin layer chromatogram on silica gel in the system shown under (1) gives $R_f$=0.65; in the system t-amyl alcohol-isopropanol-water (100:40:25) the $R_f$ value is 0.37.

(3) *(γ - tertiary butyl)-L-glutamyl-N$^{im}$-trityl-L-histidyl-L-phenylalanyl-L-arginyl-L-tryptophyl - glycine-methyl ester*

10.0 g. of the ditritylated compound obtained under (2) are dissolved in 25 ml. of acetic acid of 80% strength and heated for 2 to 3 minutes at 40° C. The solution is then frozen and lyophilized. On triturating the residue with ether there remains 8.5 g. of (γ-tertiary butyl)-L-glutamyl - N$^{im}$ - trityl - histidyl - L - phenylalanyl-L-arginyl-L-tryptophyl-glycine-methyl ester=97% of the theoretical yield, in the form of the salt (1 mol of acetic acid, ½ mol of sulfuric acid). The $R_f$ value is 0.4 in the thin layer chromatogram on silica gel in the system shown under (1).

(4) *(γ-Tertiary butyl)-L-glutamyl-N$^{im}$-trityl-L - histidyl-L-phenylalanyl-L-arginyl-L-tryptophyl-glycine*

The product obtained under (3) is dissolved in 300 ml. of dioxan of 75% strength and hydrolyzed with 20 ml. of N-sodium hydroxide solution for one hour at room temperature. The solvent is evaporated extensively in vacuo and the residue triturated with water until it is solid. Yield: 6.9 g. of (γ-tertiary butyl)-L-glutamyl-N$^{im}$-trityl-L-histidyl-L-phenylalanyl-L-arginyl-L - tryptophyl-glycine=90% of the theoretical yield. The product is identical with that described in Example 20 under (9). In the thin layer chromatogram on silica gel in the system shown under (1) the $R_f$ value is 0.3.

EXAMPLE 23

(1) *Z-Glu(OtBu)-His-Phe-Arg-Try-Gly-Lys(BOC)-Pro-Val-Gly - Lys(BOC)-Lys(BOC) - Arg-Arg-Pro - Val-Lys-(BOC)-Val-Tyr-Pro-OtBu-triacetate*

625 mg. (0.273 millimol) of H-lys(BOC)-Pro-Val-Gly - Lys(BOC) - Lys(BOC) - Arg-Arg-Pro-Val-Lys (BOC)-Val-Tyr-Pro-OtBu, 3CH$_3$COOH (prepared as described in Example 1, 16), in 10 ml. of dry pyridine are mixed with 0.17 g. of para-toluenesulfonic acid, the solution is evaporated to dryness, the residue freed from pyridine acetate by being dried for 18 hours at 35° C. under 0.01 mm. Hg pressure and from the pyridine tosylate by being triturated with acetone and suction-filtered. Yield: 726 mg. of colorless powder melting at 155–162° C.

525 mg. (0.2 millimol) of the tritosylate and 245 mg. (0.24 millimol) of Z-Glu(OtBu)-His-Phen-Arg-Try-Gly-OH (obtained by condensing carbobenzoxy - L - arginine with L-tryptophyl-glycine methylester, eliminating the carbobenzoxy group from the resulting tripeptide derivative, condensing the free tripeptide ester with carbobenzoxy-L-phenylalanine, eliminating the carbobenzoxy group from the resulting tetrapeptide ester, condensing the free tetrapeptide ester with carbobenzoxy-(γ-tert.-butyl)-L-glutamyl-L-histidine azide and hydrolyzing the methyl ester with N-sodium hydroxide in dioxane of 75% strength) are dissolved in 4 ml. of pyridine of 80% strength with stirring at 50° C. and 52 mg. (0.25 millimol) of dicyclohexylcarbodiimide added to the clear solution. The reaction mixture is stirred at 50° C. and after 3 and 6 hours respectively another 52 mg. of dicyclohexylcarbodiimide are added each time. After 20 hours the slightly turbid solution is cooled to 10° C., filtered off from precipitated dicyclohexylurea and treated with much ether while being stirred. The precipitated amorphous tritosylate of the reaction product is dissolved in 10 ml. of methanol of 60% strength and chromatographed on a column of 4 ml. of Amberlite IRA-400 (acetate form). The eluate is evaporated in vacuo and the residue triturated with ether to yield 650 mg. of crude product as triacetate. The resulting product shows in the thin-layer chromatogram the eicosapeptide derivative as main spot (about 70%) with $R_f$ 100=0.34 (on alumina) $R_f$ 101=0.76 (on silica gel), $R_f$ 110=0.45 (on silica gel). Development with Reindel-Hoppe, Pauly and Ehrlich reagents. In addition, unchanged hexapeptide and tetradecapeptide derivative are found as well as several rapidly running by-products. After splitting off the tertiary butyloxycarbonyl and tertiary butyl ester groups with trifluoroacetic acid of 90% strength (5 mg. in 0.1 ml.; 1 hour at 25° C.) the carbobenzoxy eicosapeptide shows the following $R_f$ values in the thin-layer chromatogram : $R_f$ 101=0.35 (on silica gel), $R_f$ 101=0.56 (on alumina). The protected product is reacted without any further purification.

(2) *Glu(OtBu) - His - Phe-Arg-Try-Gly-Lys(BOC)-Pro-Val - Gly - Lys(BOC) - Lys(BOC)Arg - Arg-Pro-Val-Lys(BOC)-Val-Tyr-Pro-OtBu-tetracetate*

600 mg. (0.18 millimol) of the crude protected eicosapeptide derivative described under (1) are dissolved in 10 ml. of methanol and hydrogenated overnight in the presence of 0.5 ml. of glacial acetic acid and 1 g. of palladium black (10% Pd). The catalyst is then filtered off and the filtrate evaporated in vacuo. The resulting crude product is dissolved in 10 ml. of tertiary butanol and water (1:1) and chromatographed through a column of 6 g. of carboxymethyl cellulose using a linear gradient between 100 ml. of tertiary butanol of 50% strength and 100 ml. of tertiary butanol and glacial acetic acid (9:1) of 50% strength. The fractions containing the eicosapeptide derivative according to thin-layer chromatography on silica gel are combined and evaporated in vacuo; $R_f$ values: $R_f$ 54=0.50, $R_f$ 101=0.68, $R_f$ 110=0.12. After splitting off all the protective groups the eicosapeptide shows the following $R_f$ values: $R_f$ 101=0.25 (on silica gel), $R_f$ 101=0.30 (on alumina).

(3) *BOC - Ser - Tyr - Ser-Met-Glu(OtBu)-His-Phe-Arg-Try - Gly - Lys(BOC) - Pro-Val-Gly-Lys(BOC)-Lys (BOC) - Arg - Arg - Pro - Val - Lys(BOC)-Val-Tyr-Pro-OtBu*

120 mg. (0.2 millimol) of tertiary butyloxy-carbonyl-L-seryl-L-tyrosyl-L-seryl-L-methionine hydrazide are dissolved in 1.5 ml. of dimethylformamide. 0.6 ml. of cold N-hydrochloric acid and then 0.22 ml. of N-sodium nitrite solution are then added at −10° C. with stirring. After 3 minutes the solution is diluted with 10 ml. of cold water and adjusted to pH 7–8 with N-sodium bicarbonate solution. The precipitated crystalline tertiary butyloxy - carbonyl - L-seryl-L-tyrosyl-L-seryl-L-methionine azide is filtered off after 15 minutes at 0° C., washed with ice-water and in a moist state dissolved in 3 ml. of cold dimethylformamide. After the addition of 0.02 ml. (0.15 millimol) of triethylamine and 322 mg. (0.1 millimol) of the eicosapeptide derivative described under (2), the solution is allowed to stand for 20 hours at 0° C. and then treated with much ethyl acetate. The crude tetracosapeptide derivative is then purified by multiplicative distribution over 400 stages in the system methanol-buffer-chloroform-carbon tetrachloride (8:4:5:2) in which the buffer consists of 285 ml. of glacial acetic acid and 192.5 grams of ammonium acetate dissolved in 10 liters of water and has a pH of 4.5. The main portion of the tetracosapeptide is present in fractions 75–121 (K=0.45). After evaporation of the solvent and removing the ammonium acetate by sublimation the pure protected tetracosapeptide derivative is obtained. $[\alpha]_D^{25} = -52.5° \pm 3°$ (c.=0.45 in methanol). The product is converted into the free tetracosapeptide as described in Example 19.

EXAMPLE 24

A solution of 5.1 mg. (about $1.5 \times 10^{-6}$ mol) of the free tetracosapeptide (cf. Examples 19 and 20) in 2.0 ml. of 0.1 N-potassium chloride solution is treated with 0.020 ml. of 0.1 N-hydrochloric acid and 0.020 ml. of 0.1-molar zinc sulfate solution. The solution thus contains: HCl: $2 \times 10^{-6}$; $Zn^{+2}$ $2 \times 10^{-6}$ mol; tetracosapeptide: about $1.5 \times 10^{-6}$ mol.

The solution is titrated with 0.1 N-sodium hydroxide solution. The titration curve shows a zinc complex with pK=8.35. At and above the pH of 8.35, the sparingly soluble complex begins to precipitate in the form of a very finely divided gel. It is centrifuged off at a pH of 9.5 and washed with water. The complex has a strong ACTH-activity.

EXAMPLE 25

One injection vial contains:

| 30920:[1] | Mg. |
|---|---|
| (a) | 0.25 |
| (b) | 0.5 |
| Mannitol: | |
| (a) | 10 |
| (b) | 10 |

[1] 30920 = H-Ser-Tyr-Ser-Met-Glu-His-Phe-Arg-Try-Gly-Lys-Pro-Val-Gly-Lys-Lys-Arg-Arg-Pro - Val - Lys-Val-Tyr-Pro-OH, CH₃COOH.

Method.—30920[1] and mannitol are dissolved in water for the purpose of injection, so that 1.0 ml. of solution contains 0.25 mg. and 0.5 mg. of 30920[1] respectively and 10 mg. of mannitol. The solution is filtered under sterile conditions and is put into sterilized injection vials of 1.0 ml. each under aseptic conditions and lyophilized in the conventional manner. The vials are then sealed under aseptic conditions.

What is claimed is:

L - glutamyl - (γ-tertiary butyl ester) - L - histidyl - L-phenylalanyl - L - arginyl - L - tryptophyl - glycyl - N$^\epsilon$-tertiary butyloxycarbonyl - L - lysyl - L - prolyl - L - valyl-glycyl - N$^\epsilon$ - tertiary butyloxycarbonyl - L - lysyl - N$^\epsilon$-tertiary butyloxycarbonyl - L - lysyl - L - arginyl - L-arginyl - L - prolyl - L - valyl - N$^\epsilon$ - tertiary butyloxycarbonyl - L - lysyl - L - valyl - L - tyrosyl - L - proline - tertiary butylester.

References Cited

UNITED STATES PATENTS

| 2,524,422 | 10/1950 | Boothe et al. | 260—112.5 |
| 2,900,375 | 8/1959 | Amiard et al. | 260—112.5 |
| 2,917,502 | 12/1959 | Schwyzer et al. | 260—112.5 |
| 2,938,891 | 5/1960 | Vellaz et al. | 260—112.5 |
| 3,014,023 | 12/1961 | Schwyzer et al. | 260—112.5 |
| 3,228,926 | 1/1966 | Kappeler et al. | 260—112.5 |
| 3,256,526 | 6/1966 | Schwyzer et al. | 260—112.5 |

OTHER REFERENCES

Hofmann et al.: J. Am. Chem. Soc. 83, 2294–99 (1961).

Hofmann et al.: J. Am. Chem. Soc. 84, 1054–56 (1962).

LEWIS GOTTS, *Primary Examiner.*

P. A. STITH, M. M. KASSENOFF, *Assistant Examiners.*